US010511201B2

(12) United States Patent
Kim et al.

(10) Patent No.: US 10,511,201 B2
(45) Date of Patent: Dec. 17, 2019

(54) STACKING-TYPE STATOR USING MULTILAYER PRINTED CIRCUIT BOARD, AND SINGLE-PHASE MOTOR AND COOLING FAN USING SAME

(71) Applicant: AMOTECH CO., LTD., Incheon (KR)

(72) Inventors: Byung Soo Kim, Anyang-si (KR); Jin Gwan Kim, Chuncheon-si (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 16/082,695

(22) PCT Filed: Mar. 27, 2017

(86) PCT No.: PCT/KR2017/003244
§ 371 (c)(1),
(2) Date: Sep. 6, 2018

(87) PCT Pub. No.: WO2017/164715
PCT Pub. Date: Sep. 28, 2017

(65) Prior Publication Data
US 2019/0013712 A1   Jan. 10, 2019

(30) Foreign Application Priority Data

Mar. 25, 2016   (KR) .................. 10-2016-0036291
Apr. 7, 2016    (KR) .................. 10-2016-0042726

(51) Int. Cl.
*H02K 1/00*   (2006.01)
*H02K 3/28*   (2006.01)
(Continued)

(52) U.S. Cl.
CPC ............... *H02K 3/28* (2013.01); *F04D 17/16* (2013.01); *F04D 25/0606* (2013.01);
(Continued)

(58) Field of Classification Search
CPC ........ H02K 3/26; H02K 3/28; H02K 2203/03; H02K 2211/03
(Continued)

(56) References Cited

U.S. PATENT DOCUMENTS 4,804,574 A * 2/1989 Osawa ................. H02K 3/26
310/184
7,291,956 B2 * 11/2007 Itoh .................... H02K 3/26
310/208
(Continued)

FOREIGN PATENT DOCUMENTS

JP   09191623   7/1997
JP   10248224   9/1998
(Continued)

OTHER PUBLICATIONS

International Search Report—PCT/KR2017/003244 dated Jun. 26, 2017.

*Primary Examiner* — Thanh Lam
(74) *Attorney, Agent, or Firm* — Cantor Colburn LLP

(57) ABSTRACT

Provided is a stacking-type stator using a multilayer printed circuit board (PCB) in which torque generation can be maximized in an opposite rotor, and a single-phase motor and a cooling fan both using the same. The stacking-type stator includes: a multilayer printed circuit board (PCB) that is stacked and integrated with a penetration opening; and a coil pattern patterned on each layer of the multilayer PCB, wherein throughholes are formed to penetrate the multilayer PCB and connect the coil patterns, wherein the coil pattern comprises: inner and outer rotating direction pattern portions which are arranged in a circumferential direction at intervals along an inner circumference and an outer circumference concentrically with the penetration opening; and a radial pattern portion that interconnects the inner rotating direction (Continued)

pattern portion and the outer rotating direction pattern portion that are adjacent to each other and is disposed along the radial direction.

17 Claims, 16 Drawing Sheets

(51) Int. Cl.
<table>
<tr><td>H02K 21/24</td><td>(2006.01)</td></tr>
<tr><td>F04D 17/16</td><td>(2006.01)</td></tr>
<tr><td>F04D 25/06</td><td>(2006.01)</td></tr>
<tr><td>F04D 25/08</td><td>(2006.01)</td></tr>
<tr><td>F04D 29/043</td><td>(2006.01)</td></tr>
<tr><td>F04D 29/046</td><td>(2006.01)</td></tr>
<tr><td>H02K 11/215</td><td>(2016.01)</td></tr>
<tr><td>H02K 11/225</td><td>(2016.01)</td></tr>
<tr><td>H02K 11/33</td><td>(2016.01)</td></tr>
<tr><td>F04D 29/42</td><td>(2006.01)</td></tr>
<tr><td>H02K 3/26</td><td>(2006.01)</td></tr>
<tr><td>H02K 5/16</td><td>(2006.01)</td></tr>
<tr><td>H02K 7/08</td><td>(2006.01)</td></tr>
<tr><td>H02K 21/22</td><td>(2006.01)</td></tr>
<tr><td>H02K 7/14</td><td>(2006.01)</td></tr>
</table>

(52) U.S. Cl.
CPC ......... *F04D 25/0646* (2013.01); *F04D 25/08* (2013.01); *F04D 29/043* (2013.01); *F04D 29/046* (2013.01); *F04D 29/4226* (2013.01); *H02K 3/26* (2013.01); *H02K 5/163* (2013.01); *H02K 7/085* (2013.01); *H02K 11/215* (2016.01); *H02K 11/225* (2016.01); *H02K 11/33* (2016.01); *H02K 21/22* (2013.01); *H02K 21/24* (2013.01); *H02K 7/14* (2013.01); *H02K 2203/03* (2013.01); *H02K 2211/03* (2013.01); *H02K 2213/03* (2013.01)

(58) Field of Classification Search
USPC .................................. 310/179–180, 71, 208
See application file for complete search history.

(56) References Cited

U.S. PATENT DOCUMENTS

<table>
<tr><td>2005/0285470</td><td>A1</td><td>12/2005</td><td>Itoh et al.</td><td></td></tr>
<tr><td>2007/0152519</td><td>A1</td><td>7/2007</td><td>Jarrah et al.</td><td></td></tr>
<tr><td>2013/0120096</td><td>A1*</td><td>5/2013</td><td>Liang</td><td>H02K 3/26<br>336/200</td></tr>
<tr><td>2015/0262610</td><td>A1*</td><td>9/2015</td><td>Lin</td><td>G11B 19/2009<br>360/99.08</td></tr>
<tr><td>2016/0218577</td><td>A1*</td><td>7/2016</td><td>Chen</td><td>H02K 3/26</td></tr>
<tr><td>2018/0198339</td><td>A1*</td><td>7/2018</td><td>Schuler</td><td>H02K 3/521</td></tr>
<tr><td>2019/0115129</td><td>A1*</td><td>4/2019</td><td>Kim</td><td>H02K 7/14</td></tr>
</table>

FOREIGN PATENT DOCUMENTS

<table>
<tr><td>JP</td><td>3189348</td><td>7/2001</td></tr>
<tr><td>JP</td><td>3897122</td><td>3/2007</td></tr>
<tr><td>JP</td><td>2011125168</td><td>6/2011</td></tr>
<tr><td>JP</td><td>2012050219</td><td>3/2012</td></tr>
<tr><td>KR</td><td>200296035</td><td>11/2002</td></tr>
<tr><td>KR</td><td>20060035303</td><td>4/2006</td></tr>
<tr><td>KR</td><td>20080092024</td><td>10/2008</td></tr>
<tr><td>KR</td><td>20130024687</td><td>3/2013</td></tr>
</table>

* cited by examiner

FIRST PCB LAYER

FOURTH PCB LAYER

FIRST PCB LAYER     SECOND PCB LAYER

THIRD PCB LAYER     FOURTH PCB LAYER

STACKING-TYPE STATOR USING MULTILAYER PRINTED CIRCUIT BOARD, AND SINGLE-PHASE MOTOR AND COOLING FAN USING SAME

TECHNICAL FIELD

The present disclosure relates to a motor, and more particularly, to a stacking-type stator using a multilayer printed circuit board (PCB) in which torque generation can be maximized in an opposite rotor, and a single-phase motor and a cooling fan both using the same.

BACKGROUND ART

Generally, fan motors used in electronic appliances such as computers and household appliances such as refrigerators are largely adopted as outer rotor type fan motors that can be made compact in the radial direction and the axial direction in consideration of their installation space.

In the conventional outer rotor type fan motor, since the stator adopts the core type, the height of the motor cannot be reduced. Also, since the diameter of the bearing provided at the center of the stator and supporting the rotating shaft is limited, there is a problem that sufficient oil cannot be contained therein.

Meanwhile, an axial flow fan using a coreless flat brushless motor in anticipation of ultra-lightness, ultra small size, and long life is proposed.

The axial flow fan is constituted by an axial type motor in which the field magnet of the rotary fan and the armature coil are in a face-to-face fashion, but since the structure in which an air core type armature coil is disposed in a coil installation portion is adopted, there is a problem that the height of the stator is not reduced any more.

In addition, the stator of the fan motor is constituted by stacking a stator yoke and a single-phase armature coil on top of a PCB, and a pair of ball bearings are built in a bearing holder at the center of the PCB to support the rotating shaft. However, there is a problem that the stator cannot be thinned.

Meanwhile, a small-sized fan motor is reduced in size and a single-phase motor having a single coil is used in consideration of cost burden. In this case, the single coil is wound in a quadrangular or triangular coreless/bobbinless type and mounted on a PCB as disclosed in Korean Registered Utility Model publication No. 20-0296035 (Patent Document 1).

BLDC motors are synchronous motors with fast dynamic response, low rotor inertia and easy speed control.

When a brushless direct current (BLDC) motor is used as the single-phase motor, a Hall sensor for rotor position detection is required to detect the N-pole and S-pole magnetic poles of the rotor to generate a switching signal of the driving current to the stator coil and the Hall sensor is expensive. Therefore, it is preferable to use a driving circuit using only one Hall sensor.

In this case, in the case that a single Hall sensor is used, the magnetic pole of the Hall sensor is not detected when the Hall sensor is located at the interface of the rotor magnetic pole, and thus the current cannot be supplied to the stator coil. Therefore, there is a dead point at which the starting cannot be performed.

In such a single Hall sensor system, there is a method in which auxiliary magnets are used so that the Hall sensor deviates from a magnetic pole interface (that is, a neutral point) of a rotor by using a magnet for fixation to the stator as a self-starting scheme so as to avoid the dead point, and there is also a method of using a dead point prevention yoke of a special shape as in Patent Document 1.

In the case of using a Hall sensor for rotor position detection for generating a switching signal of the driving current for the stator coil, the cost increase factor occurs since it is necessary to use an expensive Hall sensor and to mount the additional components for the self-starting. Therefore, there is a demand for a method of generating a rotor position signal while minimizing the cost increase factor without using the Hall sensor.

In addition, various sensorless motor driving methods have been proposed for detecting rotor position signals without using a Hall sensor. Among the various sensorless motor driving methods, it is possible to employ a double winding method in which a main coil is wound first and an auxiliary coil for detecting the rotor position is wound once again and extended from each coil to be connected to the drive circuit. However, such a double winding method has a disadvantage that it is difficult to use it because of its complicated structure and complicated winding.

Furthermore, in the case of a small fan, the coil is composed of fine wires in a general coil winding method in which a stator coil is wound on a bobbin, a stator coil is wound in a bobbinless type, or a stator coil is wound on a core. Therefore, when the thickness of the coil is constant in the start line and the end line, there is a problem that the start line and the end line may be broken due to careless handling or vibration during soldering, or the manual soldering process may be defective.

Meanwhile, when wireless power transmission (particularly, rapid charging) is performed to the terminal, the wireless charger generates a lot of heat in the transmission coil and the electronic component, and the charging efficiency is lowered. Accordingly, a cooling fan for preventing a temperature rise in the wireless charger by an air cooling method is required. A fan motor that is slimmer and smaller than the conventional fan motor is required for such a cooling fan.

DISCLOSURE

Technical Problem

Accordingly, the present disclosure has been made to solve the above problems, and it is an object of the present disclosure to provide a stacking-type stator using a multilayer printed circuit board (PCB), in which the stacking-type stator for use in a single-phase motor is configured by using a multilayer PCB wherein a coil pattern of each layer has a star pattern in which a plurality of rotating direction pattern portions and a plurality of radial direction pattern portions are alternately connected and the radial direction pattern portions are oriented in a radial direction so that a rotational force applied to an opposite rotor can be maximally obtained, and a single-phase motor and a cooling fan both of which use the stacking-type stator.

Another object of the present disclosure is to provide a stacking-type stator realized by using a minimum number of PCB layers by connecting conductive pattern coils of a multilayer structure without using a plurality of wiring pattern PCBs, and a slim-type single-phase motor and a cooling fan both using the stacking-type stator.

It is another object of the present disclosure to provide a stacking-type stator that can inexpensively and simply implement a sensorless motor driving circuit by disposing a sensing coil for rotor position detection in an empty space where no pattern coil is formed in one side of a PCB facing a rotor, and a slim-type single-phase motor using stacking-type stator.

Another object of the present disclosure is to provide a cooling fan capable of implementing a dead point prevention function without forming a separate dead point prevention yoke by forming a bridge corresponding to the number of rotor magnetic poles while forming a wind inlet in a lower case.

It is another object of the present disclosure to provide a slim-type single-phase motor capable of expanding diameter of a sleeve bearing for supporting a rotating shaft of a rotor so as to contain sufficient oil, by utilizing a space in which a core type stator which has been conventionally employed in a radial type motor has been removed by adopting an axial type structure using a thin film stator, thereby improving reliability and durability, and a cooling fan equipped with the single-phase motor.

It is another object of the present disclosure to provide a stacking-type stator in which a start portion and an end portion of respective layer coil patterns in the stacking-type stator are formed wider than portions forming coils (windings) to easily interconnect the coil patterns, and easily connect with wiring patterns, and a slim-type single-phase motor using the same.

Technical Solution

According to a first aspect of the present disclosure, there is provided a stacking-type stator for a single-phase motor, the stacking-type stator comprising: a multilayer printed circuit board (PCB) that is stacked and integrated with a penetration opening; coil patterns patterned on respective PCB layers of the multilayer PCB; and throughholes formed to penetrate the multilayer PCB and connect the coil patterns, wherein each of the coil patterns comprises: inner and outer rotating direction pattern portions which are arranged in a circumferential direction at intervals along an inner circumference and an outer circumference concentrically with the penetration opening; and a radial direction pattern portion that interconnects the inner rotating direction pattern portion and the outer rotating direction pattern portion that are adjacent to each other and is disposed along the radial direction.

The coil pattern may be patterned in a spiral pattern so that protrusions and recesses are repeated along the perimeter of the penetration opening to form a plurality of turns, and the number of protrusions and recesses may be set to any one of the same number, half the number, and two-times the number as the number of rotor magnetic poles.

The coil pattern may be spirally patterned to form a plurality of turns.

The coil pattern may include first to third layer coil patterns formed on first to third PCB layers which are respectively sequentially stacked, in which the first and third layer coil patterns may have the same shape and the second layer coil pattern may be set to be positioned at a position rotated from the first layer coil pattern to the center of the penetration opening by (360°/rotor magnetic pole number).

The stacking-type stator for a single-phase motor according to an embodiment may further comprise a motor driving circuit mounted on the lowermost PCB layer of the multilayer PCB and applying a driving current to a stator coil formed by the layer coil patterns.

In this case, the lowermost PCB layer may further include fourth and fifth layer coil patterns arranged in a line-symmetrical structure, and may further include at least one jumper wire pattern connecting the fourth and fifth layer coil patterns.

The throughholes may be disposed in a throughhole region located between an outer circumferential portion of the inner rotating direction pattern portion and an inner circumferential portion of the outer rotating direction pattern portion and an outer region located outside the layer coil patterns when the layer coil patterns overlap.

The stacking-type stator for a single-phase motor according to an embodiment may further comprise a sensing coil formed on the first PCB layer of the multilayer PCB and formed in one of the plurality of recesses of the layer coil pattern to detect the rotor rotating position.

The radial direction pattern portion of the layer coil pattern is connected in such a manner that a current flows in the same direction, thereby generating a rotational force in the tangential direction to a rotor.

The number of the radial direction pattern portions may be set to any one of the same number, half the number, and two-times the number as the number of rotor magnetic poles, and an angle between the adjacent radial direction pattern portions is set to a value of 360°/n (Here, n may be any one of the same number, half the number, and two-times the number as the number of rotor magnetic poles).

According to a second aspect of the present disclosure, there is provided a stacking-type stator for a single-phase motor, the stacking-type stator comprising: at least one coil pattern layer in which a plurality of coil patterns patterned in a helical pattern are connected by a plurality of throughholes formed to penetrate a multilayer printed circuit board (PCB) so as to form a plurality of turns having two or more protrusions and recesses on respective PCB layers of the multilayer PCB having a penetration opening along the periphery of the penetration opening; and a driving circuit layer laminated on a bottom surface of the coil pattern layer and mounted with a motor driving circuit for applying a driving current to the coil patterns, in which the plurality of coil patterns comprise: a plurality of radial direction pattern portions which are arranged in the radial direction for every angle of 360°/n (Here, n may be any one of the same number, half the number, and two-times the number as the number of rotor magnetic poles), and generates a rotational force in the tangential direction to a rotor; a plurality of inner rotating direction pattern portions interconnecting the inner sides of the adjacent radial direction pattern portions; and a plurality of outer rotating direction pattern portions interconnecting the outer sides of the adjacent radial direction pattern portions.

The coil pattern layer may have different coil patterns in the odd-numbered layer and the even-numbered layer, in which case, the odd-numbered layer coil pattern may form a winding in a clockwise (CW) direction from the inside to the outside, and the even-numbered layer coil pattern may form a winding in a counterclockwise (CCW) direction from the inside to the outside.

In addition, the coil pattern layer may have the same coil pattern shape in all layers, in which the odd-numbered layer coil pattern may form a winding in a clockwise (CW) direction from the inside to the outside, and the even-numbered layer coil pattern may form a winding in a clockwise (CW) direction from the outside to the inside.

Furthermore, a start portion and an end portion of the coil pattern may be formed wider than the portion forming the coil, and at least one throughhole and a soldering land surrounding the throughhole may be disposed.

According to a third aspect of the present disclosure, there is provided a single-phase motor comprising: a rotating shaft; a rotor having the rotating shaft supported at a center of the single-phase motor and having a plurality of N-pole magnets and S-pole magnets arranged alternately; a bearing rotatably supporting the rotation shaft; a bearing holder for receiving and fixing the bearing; and the above-described stacking-type stator in which a penetration opening through which the bearing holder passes is formed.

The single-phase motor according to an embodiment further comprises: a dead point prevention yoke disposed at a lower portion of the stacking-type stator and having a polygonal corner in which the centers of a plurality of magnets are opposed to each other when the rotor is in an initial state; and a Hall sensor provided on a layer of the stacking-type stator and arranged at a position shifted by ¼ magnetic pole width or ¾ magnetic pole width from an interface of the rotor magnetic pole in the initial state of the rotor to generate a rotor position signal in which the Hall sensor may be disposed at a position overlapping one of the radial direction pattern portions of the stator.

Further, the Hall sensor may be disposed between a boundary surface of the rotor magnetic pole and a position shifted by a ¼ magnetic pole width from the boundary surface.

In this case, the rotor may be formed in a ring shape, and the width of the ring may be formed to be larger than at least the length of the radial direction pattern portion, and may be arranged to face the radial direction pattern portion.

According to a fourth aspect of the present disclosure, there is provided a cooling fan comprising: a rotor having a rotating shaft supported at a central portion thereof, a plurality of blades for an impeller at an outer circumferential portion thereof, and a plurality of N-pole magnets and S-pole magnets alternately arranged; a bearing rotatably supporting the rotating shaft; a bearing holder for receiving and fixing the bearing; a lower case for supporting the bearing holder; the above-described stacking-type stator in which a penetration opening through which the bearing holder passes is formed and supported by the lower case; an upper case disposed opposite to the lower case; and a side wall connecting the upper case and the lower case.

The cooling fan may be configured to a sirocco type in which a wind inlet is formed in at least one of the upper case and the lower case and a wind outlet is formed in a part of the side wall or an axial flow type in which a wind inlet and a wind outlet are formed in the upper case and the lower case.

A back yoke of the rotor may comprise: a coupling portion formed with a penetration opening through which a rotating shaft is fixed at a central portion thereof and protruding inward; a first cylindrical portion forming a first end receiving groove in which the bearing holder is accommodated on an inner side thereof; a second cylindrical portion forming a second end receiving groove in which a plurality of magnets are installed on an outer side thereof and formed in a size corresponding to that of the stator; and a stepped portion connecting the first cylindrical portion and the second cylindrical portion, wherein the plurality of blades constituting the impeller may surround the second end receiving groove of the back yoke and may be extendibly formed in the same level as the second cylindrical portion.

Further, the plurality of blades constituting the impeller may be extendibly formed while surrounding the first and second end receiving grooves of the back yoke.

The lower case may comprise: a ring portion formed at a center thereof with a penetration opening through which the bearing holder passes; and a plurality of bridges connecting the ring portion and the lower case main body, wherein the plurality of bridges may be formed in a number equal to the number of the rotor magnetic or the number of that is the number of magnetic poles/2 to have a dead point prevention yoke function.

Advantageous Effects

As described above, in the present disclosure, the stator coil for rotating the rotor is implemented as a thin film type using the conductive pattern coil formed on the multilayer PCB, thereby realizing a slim-type single-phase motor capable of improving productivity and reducing cost, to thus provide a slim-type cooling fan for various electronic devices. Particularly, the cooling fan can be applied to a slim-type electronic device such as a wireless charger.

In addition, according to the present disclosure, since an axial type structure using a thin film type stator is employed, a space in which a core type stator used in a conventional radial type motor is removed and a space obtained by omitting a coil terminal connection portion are used so that the diameter of the sleeve bearing supporting the rotating shaft of the rotor can be expanded so as to contain sufficient oil, thereby improving reliability and durability.

Further, in the present disclosure, a stacking-type stator for a single-phase motor is constituted by using a multilayer printed circuit board (PCB), and a coil pattern of each layer is formed so as to have a star pattern in which a plurality of rotating direction pattern portions and radial direction pattern portions are alternately connected, to thereby design the motor so as to maximize the torque generation in the opposite rotor so that the efficiency of the motor can be increased. That is, the radial direction pattern portions are oriented in the radial direction, so that a tangential force is generated when the stator coil is energized, so that an effective torque can be obtained.

Further, in the present disclosure, by setting the throughholes of the respective PCB layers in the PCB at the same position, it is possible to connect the coil patterns of the multilayer structure in a serial or parallel connection manner without using a plurality of wiring pattern PCBs to stack the coil patterns in a slim shape.

In the present disclosure, a dead point prevention function can be implemented without forming a separate dead point prevention yoke by forming a bridge corresponding to the number of rotor magnetic poles while forming a wind inlet in a lower case. That is, since the bridge formed in the lower case has a dead point prevention yoke function, when a separate dead point prevention yoke is used, a magnetic starting failure due to an error in the alignment between the Hall sensor and the yoke occurs can be prevented.

Further, in the present disclosure, the sensor coil for detecting the rotor position is disposed in an empty space where the pattern coil is not formed in one surface of the PCB facing the rotor without using the rotor position detecting Hall sensor, thereby making the inexpensive and simple sensorless driving circuit.

According to the present disclosure, in the stacking-type stator, the thicknesses of the coil patterns of each layer are adjusted so that the start portion and the end portion are designed to be wider than the portions forming the coils (winding), for example, in the form of a tear drop, to thereby increase the reliability of connections.

That is, the start portion and the end portion of the coil pattern are formed in the form of a tear drop, and the throughholes and the soldering lands surrounding the throughholes are disposed to interconnect the coil patterns, or ease the connections to the wiring patterns and guarantee the reliability of the connections.

Further, in order to increase the reliability, at least one throughhole connecting the start portion and the end portion to each layer may be formed so as to prevent the reliability from being deteriorated due to the breakage of the wire or the badness of the throughhole.

BEST MODE

Figure 1:
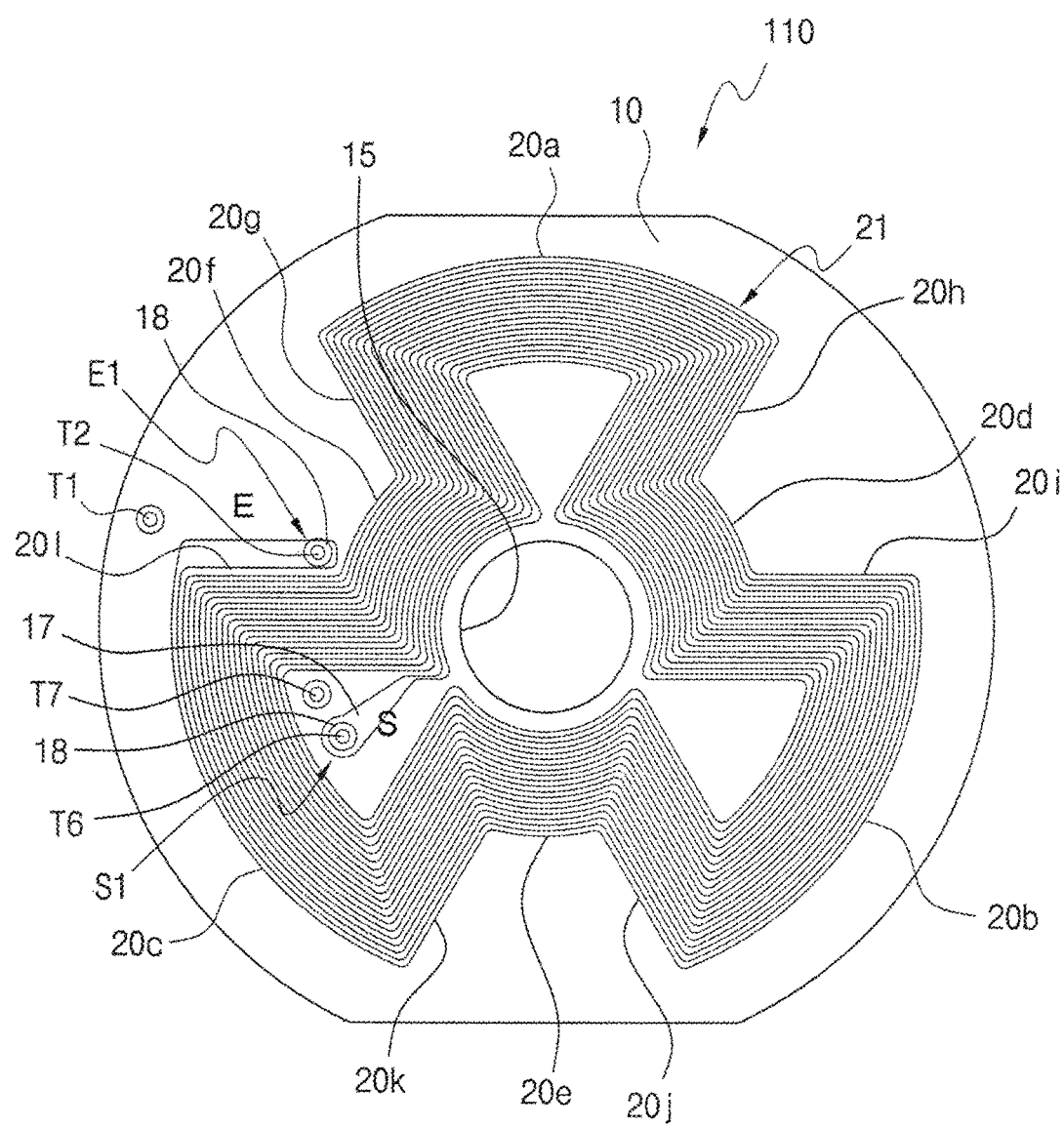
FIG. 1 is a plan view showing a stacking-type stator for a single-phase motor according to the present disclosure.

Hereinafter, embodiments of the present disclosure will be described in detail with reference to the accompanying drawings. The sizes and shapes of the components shown in the drawings may be exaggerated for clarity and convenience.

Referring to FIGS. 1 to 3B, a stacking-type stator 110 for a single-phase motor according to an embodiment of the present disclosure can be constructed by patterning a copper foil of a multilayer printed circuit board (PCB) 10 of each layer of which is made of a copper-clad laminate (CCL). In the following description, the term "PCB" may be used to abbreviate a printed circuit board.

The stacking-type stator 110 includes: a multilayer printed circuit board (PCB) 10 in which a plurality of PCB layers are stacked and integrated and made of an insulating material; a plurality of coil patterns 21 to 25 made of helical conductive patterns obtained by patterning a copper foil stacked on the respective PCB layers so as to form a plurality of turns necessary for constructing a stator coil; and a plurality of throughholes T1 to T7 plated onto throughholes formed to penetrate the multilayer PCB 10 to connect the plurality of coil patterns 21 to 25 and the like.

The plurality of coil patterns 21 to 25 include: inner and outer rotating direction pattern portions 20$a$-20$f$ which are arranged in a circumferential direction at intervals along an inner circumference and an outer circumference concentrically with the throughholes; and a plurality of radial direction pattern portions 20$g$-20$l$ that interconnect the inner rotating direction pattern portion and the outer rotating direction pattern portion that are adjacent to each other and are disposed along the radial direction from a center thereof.

In the following description, a multilayer PCB is described with an example that a coil pattern is formed by patterning a copper clad laminate (CCL). However, it is possible to form a multilayer PCB by printing a coil pattern on a general PCB using silver paste or copper paste without using a copper clad laminate. Even this case should also be regarded as falling within the scope of the present disclosure.

The multilayer PCB 10 may be made of an insulating resin such as FR-4 or CEM-3 made of a glass epoxy laminate, for example, as a PCB material. The multilayer PCB 10 has a structure in which a copper foil is stacked on each PCB layer, and any insulating resin can be used as the material of the PCB as long as a multilayer printed circuit board (PCB) can be formed. The number of layers of the PCB can be set within a range of one to ten layers in proportion to a desired RPM of a single-phase motor. It is required to increase the number of PCB layers stacked to use the plurality of coil patterns 21 to 25 since a large number of coil turns is required so as to obtain a high torque value, In order to obtain a high RPM.

When a multilayer board 10 in which multilayer PCB layers are stacked is used, a printed wiring 17 for interconnecting a coil pattern and an electronic component is formed on the lowermost PCB layer, and various electronic components 16 are mounted on the printed wiring 17, to thus form a motor driving circuit 30. A driving power supply is connected to the power supply terminal Vcc of the printed wiring 17 and the ground pattern GND.

The stator for a single-phase motor according to the present disclosure may be constructed using a double-sided PCB having a copper foil laminated on both sides of the multilayer PCB 10, in which case a high RPM is not required. The coil pattern 21 may be formed on one surface of the multilayer PCB 10 and the motor driving circuit 30 may be mounted on the other surface of the multilayer PCB 10.

Figure 2A:
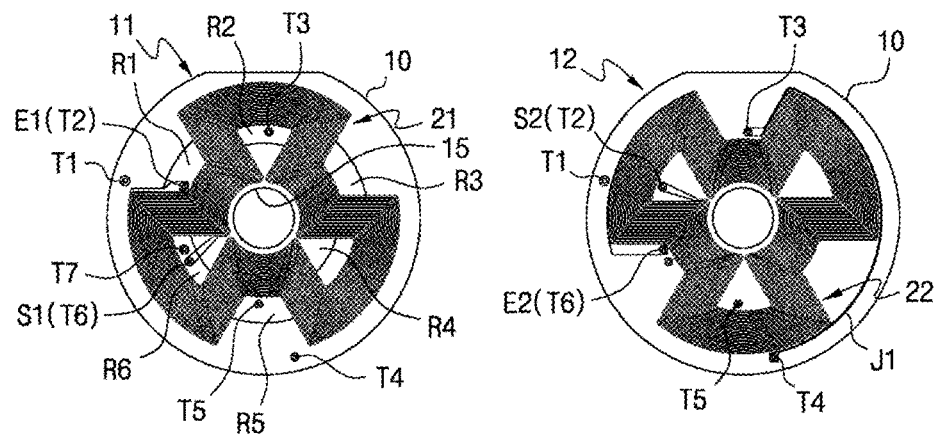
FIGS. 2A and 2B are development views showing coil patterns for respective PCB layers of a stacking-type stator according to a first embodiment of the present disclosure.
Figure 2B:
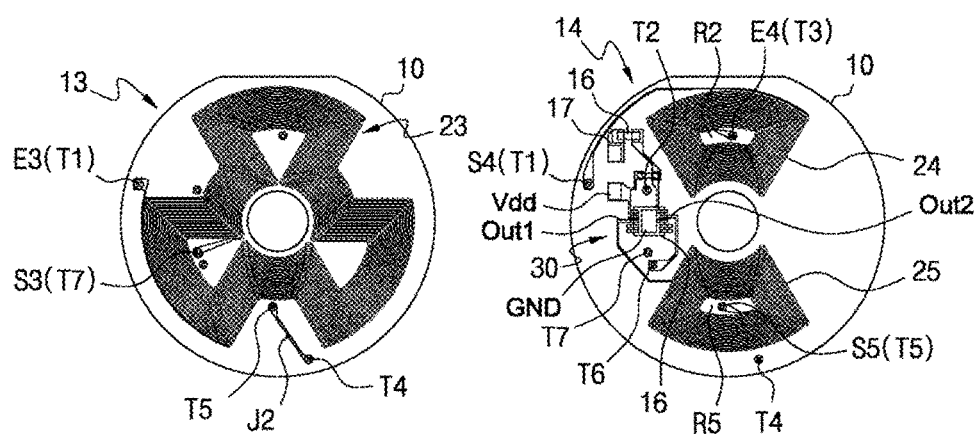

In the following description of the embodiment, it is assumed that the multilayer PCB 10 is a multilayer substrate in which first to fourth PCB layers 11 to 14 having a four-layer structure are stacked as shown in FIGS. 2A and 2B.

The first to third PCB layers 11 to 13 are respectively formed with first to third coil patterns 21 to 23 having a star shape, for example, on the upper surface of the substrate and the fourth PCB layer 14 of the lowermost layer is formed with, for example, separate fan-shaped fourth and fifth coil patterns 24 and 25, respectively, and are formed by finely patterning a conductive metal such as a copper (Cu) foil, for example. Each of the first to fourth PCB layers 11 to 14 may be selected from among those having various thicknesses of, for example, 0.4 mm and 0.8 mm, and the coil patterns 21 to 25 applied to this embodiment are patterned so that, for example, the pattern width is 0.12 mm, and the interval between adjacent patterns is 0.13 mm. The width of the coil pattern and the distance between the patterns can be increased or decreased as needed.

The first and third coil patterns 21 and 23 and the fourth coil pattern 24 are formed so as to have a helical shape in a clockwise (CW) direction from the inside to the outside, respectively, and have a zigzag shape so as to have three protrusions and three recesses to form a roughly "star" shape. The second coil pattern 22 and the fifth coil pattern 25 are formed so as to have a helical shape in a counter-clockwise (CCW) direction from the inside to the outside, respectively, and have a zigzag shape so as to have three protrusions and three recesses to form a roughly "star" shape.

Of course, each of the first to third coil patterns 21 to 23 has a helical shape and is directed from the inside to the outside or from the outside to the inside depending on the connection pattern of the coil pattern using the throughholes. Each of the first to third coil patterns 21 to 23 can be configured by combining patterns oriented in a CW or CCW direction, and may have a zigzag shape so as to have two or more protrusions and two or more recesses in a large scale.

Figure 4A:
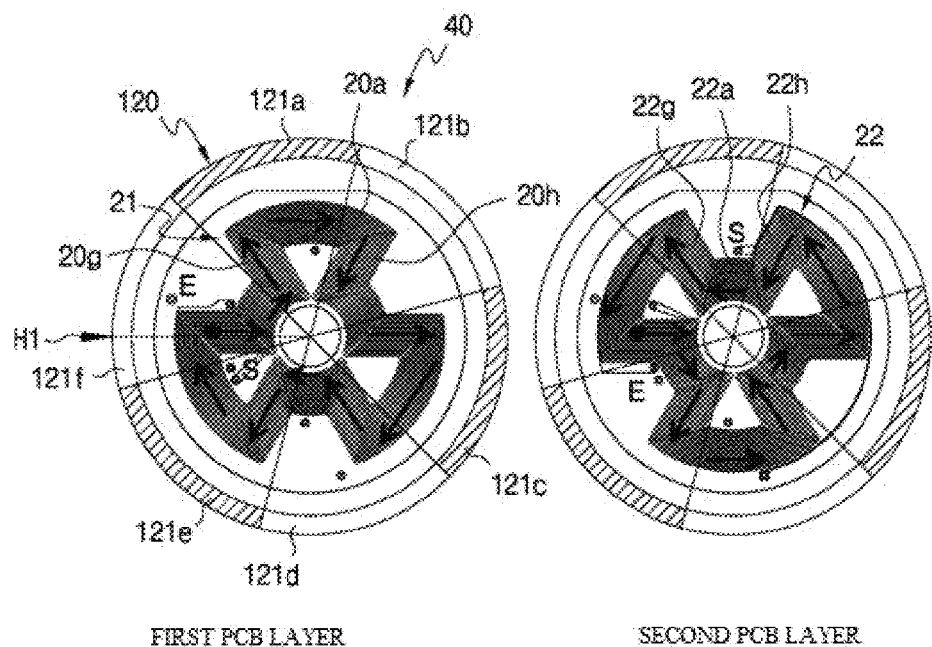
FIGS. 4A and 4B are explanatory diagrams for explaining the operation of a single-phase motor using a stacking-type stator according to the present disclosure, which show the directions of currents when the rotor is at the initial position.
Figure 4B:
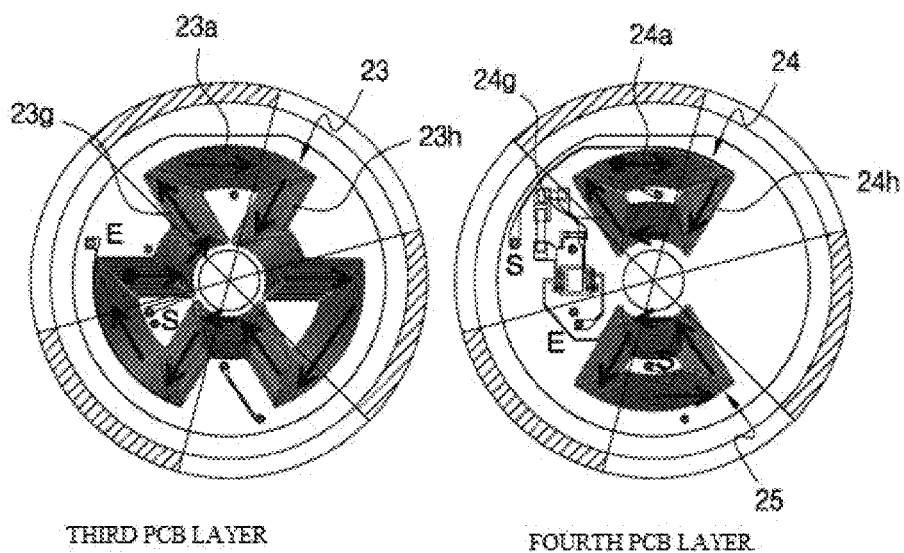

As shown in FIGS. 4A and 4B, each of the first to third coil patterns 21 to 23 includes three outer and inner rotating direction pattern portions 20a to 20c and 20d to 20f, and six radial direction pattern portions 20g to 20l connecting the outer rotating direction pattern portions 20a to 20c and the inner rotating direction pattern portions 20d to 20f, which are alternately connected to form a star shape as a whole.

The outer and inner rotating direction pattern portions 20a to 20c and 20d to 20f are arranged along the circumferential direction with an interval between the outer circumference and the inner circumference, respectively, each of the six radial direction pattern portions 20g to 20l is oriented along a direction which radiates from the center of the PCB as a whole, and the inner ends thereof have a pattern shape such that the interval between the two inner ends is narrower.

The first and third coil patterns 21 and 23 of the first and third PCB layers 11 and 13 are formed in the same shape and the second coil pattern 22 of the second PCB layer 12 is formed in the same shape as the first and third coil patterns 21 and 23, but is deviated by a phase difference of 60 degrees.

As a result, when the first to third PCB layers 11 to 13 are stacked, the six radial direction pattern portions 20g to 20l in the first to third coil patterns 21 to 23 are arranged at the same position. Therefore, as described later, when three PCB layers are stacked, the radial direction pattern portions 20g to 20l have a position where the coil patterns stacked in three layers are opposed to the magnets of the rotor at the same time, and the flow direction of the current is set equal. As a result, the combined torque is generated.

The stator 110 according to an embodiment interconnects the first to fifth coil patterns 21 to 25 formed on the multilayer PCB 10 to form a stator coil, The number of the radial direction pattern portions 20g to 20l in the stator coil is equal to the number of rotor magnetic poles, one-half of the number of rotor magnetic poles or two times of the number of rotor magnetic poles) and is set to be the same as the number of rotor magnetic poles of the opposite rotor, and an angle between the adjacent radial direction pattern portions is set to a value of 360°/n where n may be any one of the same number, half the number, and two-times the number as the number of rotor magnetic poles.

Therefore, in the case of the stator having the six radial direction pattern portions 20g to 20l shown in FIGS. 2A and 2B, the angle between the adjacent radial direction pattern portions 20g to 20l is 60°, and The number of magnetic poles (N-pole and S-pole magnets) of the rotor coupled to a single-phase motor is configured to have six poles, in order to form the single-phase motor.

The printed wiring 17 necessary for mounting and wiring various electronic components 16 is formed in the fourth PCB layer 14 in a conductive pattern so as to form the driving circuit 30 necessary for driving the single-phase motor.

In addition, the fourth PCB layer 14 may be formed with fourth and fifth coil patterns 24 and 25 to be added to the first to third coil patterns 21 to 23 by utilizing a space remaining after mounting the driving circuit component, and The fourth and fifth coil patterns 24 and 25 may be omitted depending on the torque value required to rotate the rotor.

The fourth PCB layer 14 shown in FIG. 2B is shown in a perspective view, and various patterns, i.e., the fourth and fifth coil patterns 24 and 25, and the printed wiring 17 and the electronic component 16 mounted thereon are located on the rear surface of the multilayer PCB 10.

The fourth coil pattern 24 is a fan-shaped pattern having a helical shape in a clockwise (CW) direction from the outside to the inside, and the fifth coil pattern 25 is a fan-shaped pattern having a helical shape in a counterclockwise (CCW) direction from the inside to the outside.

When the first to fourth PCB layers 11 to 14 according to an embodiment are stacked, the first to fifth coil patterns 21 to 25 are interconnected in serial or parallel manner through the first to seventh throughholes T1 to T7, to thereby form one stator coil. The first to seventh throughholes T1 to T7 are plated or filled with a conductive material in the throughholes.

The stator for a single-phase motor according to an embodiment of the present disclosure is characterized in that first to third coil patterns 21 to 23 having a star shape are formed on the upper surface of the multilayer PCB 10, and the first to third PCB layers 11 to 13 formed with the first to third coil patterns 21 to 23 form a coil pattern layer, and the fourth PCB layer 14 forms a driving circuit layer on which the motor driving circuit 30 is mounted.

Figure 3A:
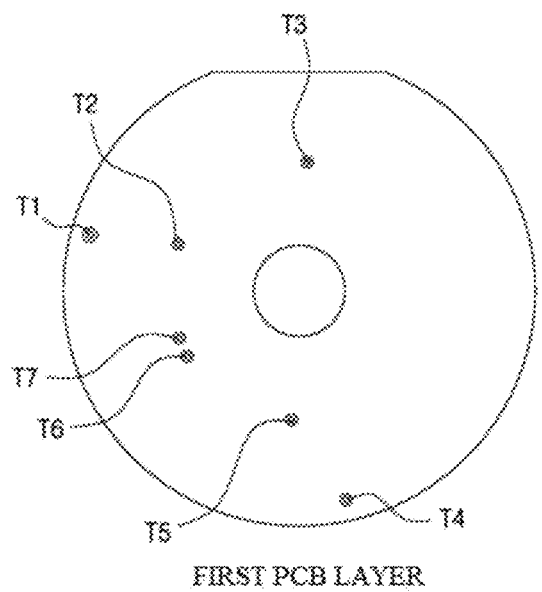
FIGS. 3A and 3B are plan views showing soldering patterns of a first PCB layer and a fourth PCB layer of a multilayer printed circuit board (PCB), respectively.
Figure 3B:
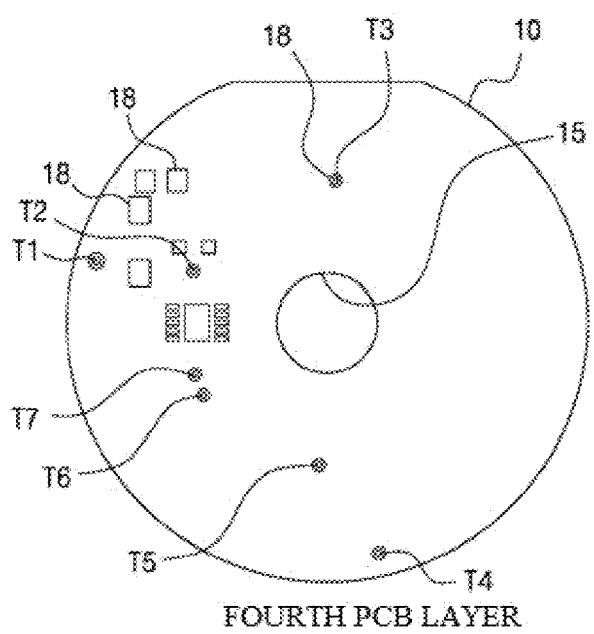

In some embodiments, seven throughholes T1 to T7 are formed at the same positions of the first to fourth PCB layers 11 to 14 as shown in FIG. 3A, and a soldering land 18 is formed in a conductive pattern as shown in FIG. 3B. As shown in FIGS. 3A and 3B, the start portions S1 to S5 and the end portions E1 to E4 of the first to fifth coil patterns 21 to 25 are formed wider than the portions forming the coils (windings), for example, in the form of a tear drop, and the throughholes T1 to T7 and soldering lands 18 surrounding the through holes T1 to T7 are disposed.

As a result, in some embodiments, the start portions S1 to S5 and the end portions E1 to E4 are designed to be wider than the portions forming the coils (windings) by controlling the thickness of respective layer coil patterns 21 to 25 in the stacking-type stator, to thereby increase the reliability of the connections.

That is, the start portion and the end portion of the coil pattern are formed in the form of a tear drop, and the throughholes and the soldering lands surrounding the throughholes are disposed to interconnect the coil patterns, or ease the connections to the wiring patterns and guarantee the reliability of the connections.

Further, in order to increase the reliability, at least one throughhole connecting the start portion and the end portion to each layer may be formed so as to prevent the reliability from being deteriorated due to the breakage of the wire or the badness of the throughhole.

In order to connect the fourth coil pattern 24 and the fifth coil pattern 25 which are separately formed on the upper and lower sides of the fourth PCB 14, a first jumper wire pattern J1 connecting the throughholes T3 and T4 is formed on the outer periphery of the second coil pattern 22, in the second PCB layer 12, and In order to connect an internal start portion S5 with the outside of the fifth coil pattern 25 on the fourth PCB layer 14, a second jumper wire pattern J2 connecting a fourth throughhole T4 and a fifth throughhole T5 is formed on the outer side of the third coil pattern 23, in the third PCB layer 13.

When the first to fourth PCB layers 11 to 14 according to an embodiment are stacked, the first to fifth coil patterns 21 to 25 are interconnected through the throughholes T1 to T7 and the first and second jumper wire patterns J1 and J2, to thereby form one stator coil.

That is, the end portion E1 of the first coil pattern 21 of the first PCB layer 11 is connected to the start portion S2 of the second coil pattern 22 of the second PCB layer 12 through the second throughhole T2, and the end portion E2 of the second coil pattern 22 is connected to the start portion S3 of the third coil pattern 23 of the third PCB layer 13 through the sixth throughhole T6.

In addition, the end portion E3 of the third coil pattern 23 is connected to the start portion S3 of the fourth coil pattern 24 of the fourth PCB layer 14 through the first throughhole T1, and the end portion E4 of the fourth coil pattern 24 and the start portion S5 of the fifth coil pattern 25 are interconnected through the first jumper wire pattern J1 connecting the throughhole T3 and the throughole T4 and the jumper wire pattern J2 connecting the throughhole T4 and the throughhole T5.

As a result, one end of the stator coil, that is, the end portion of the fifth coil pattern 25 is connected to the first output terminal Out1 of the driving circuit, and the other end of the stator coil, that is, the start portion S1 of the first coil pattern 21 is connected to the second output terminal Out2 of the driving circuit through the sixth throughhole T6.

In some embodiments, the widths of the first to fifth coil patterns 21 to 25 are set so that six throughhole regions R1 to R6 where the coil patterns are not overlapped with each other are present between the inner circumferential portion of the outer rotating direction pattern portions 20a to 20c of the first and third coil patterns 21 and 23 and the outer circumferential portion of the inner rotating direction pattern portion of the second coil pattern 22, and between the outer circumferential portion of the inner rotating direction pattern portions 20d to 20f of the first and third coil patterns 21 and 23 and the inner circumferential portion of the outer rotating direction pattern portions of the second coil pattern 22, and the first to seventh throughholes T1 to T7 are disposed by using the six throughhole regions R1 to R6 and an outer space of the first to fifth coil patterns 21 to 25.

As a result, in some embodiments, when connecting the start or end terminal disposed inside the first to fifth coil patterns 21 to 25 to the coil pattern of the other PCB layer, the throughholes T2, T3, and T5 to T7 formed by using one of the six throughhole regions R1 to R6 may be used.

In some embodiments, the throughholes T1 to T7 are disposed by appropriately using the throughhole regions R1 to R6 and the outer space so that the coil patterns of the multilayer PCB can be connected in series or in parallel without using a separate wiring pattern PCB.

Figure 10:
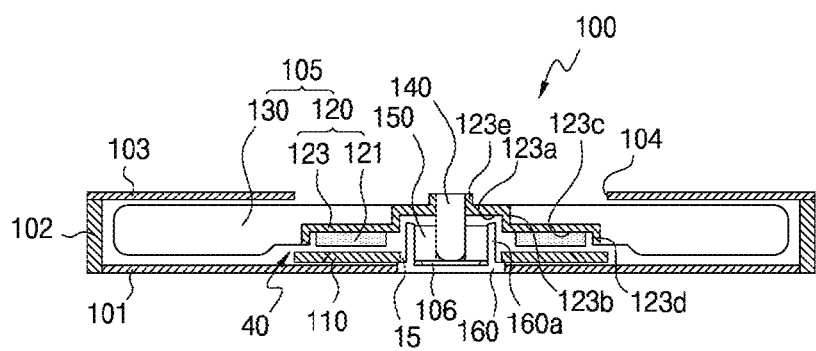
FIGS. 10 and 11 are axial cross-sectional views illustrating first and second embodiments of a slim-type cooling fan according to the present disclosure.
Figure 11:
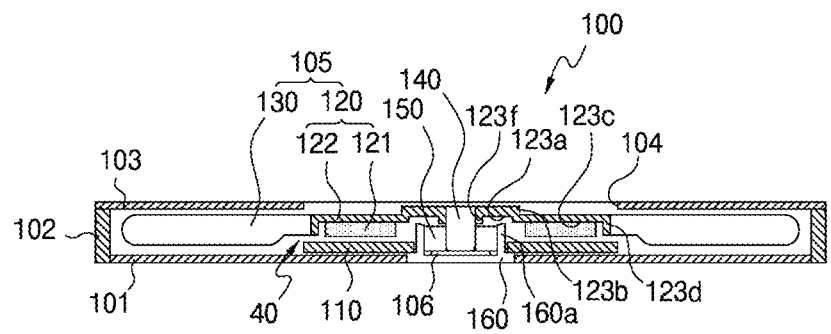

Although the driving circuit 30 for driving the single-phase motor is mounted on the fourth PCB layer 14 in the embodiment shown in FIG. 2, the driving circuit may be separately formed. In other words, as shown in FIGS. 10 and 11, when a sufficient space is not secured between a stator and a lower case on which the stator is mounted, only a minimum number of driving circuit components can be mounted on the rear surface of the fourth PCB layer 14.

Hereinafter, a single-phase motor using the stacking-type stator according to an embodiment of the present disclosure will be described with reference to FIGS. 4 to 5D. In FIGS. 5A to 5D, the current flow for each rotational position of the rotor is the same as the current flow for the first coil pattern 21 of the first PCB layer 11 and the second to fifth coil patterns 22 of the second to fourth PCB layers 12-14 and thus only the first coil pattern 21 of the first PCB layer 11 will be described.

The illustrated single-phase motor 40 has a structure in which a stator 110 and a rotor 120 of a 6-slot-6-pole structure are arranged in an axial type so as to face each other, but the stator 110 and the rotor 120 of the 6-slot-6-pole structure are shown together on the same plane for convenience of explanation in FIG. 4.

When the driving power source Vcc is supplied to the motor driving circuit 30 when the rotor 120 is at the initial position (i.e., 0°), the Hall sensor H1 recognizes the magnetic pole (S-pole) of the rotor, to thus generate a pair of first rotor position signals including a rotating direction (i.e., counterclockwise direction (CCW)) and apply the generated pair of first rotor position signals to two first and second switching transistors of the motor driving circuit 30. In this case, the first switching transistor is turned on and the second switching transistor is turned off so that the direction of current flow of the driving current to the stator coils, that is, the first to fifth coil patterns 21 to 25, is determined.

The current flows in the direction from the start portion S1 of the first coil pattern 21 to the end portion of the fifth coil pattern 25 as the rotating direction of the rotor is determined as the counterclockwise (CCW) direction, and the directions of current flow is indicated by arrows in the first to fifth coil patterns 21 to 25.

In this case, since the outer and inner rotating direction pattern portions 20a to 20c and 20d to 20f of the first to fifth coil patterns 21 to 25 are arranged in a substantially concentric circle shape, the force (F) generated by the Fleming's left-hand rule is directed in the radial direction and thus does not affect the torque generation.

The first to fifth coil patterns 21 through 25 are connected to each other through the throughholes T1 through T7 and the jumper wire patterns J1 and J2 so that the flow directions of the driving currents flowing through the radial direction pattern portions at the same positions are the same.

For example, the radial direction pattern portions 20g and 20h of the first coil pattern 21 are arranged so that the direction of current flow is set in the same direction as the radial direction pattern portions 22*g* and 22*h* of the second coil pattern 22, the radial direction pattern portions 23*g* and 23*h* of the third coil pattern 23, and the radial direction pattern portions 24*g* and 24*h* of the fourth coil pattern 24. As a result, the radial direction pattern portions 20*g* to 20*l* are oriented in the radial direction (i.e., normal direction) perpendicular to the rotating direction (i.e., circumferential direction) of the rotor 120, and thus a tangential force F is generated in the counterclockwise (CCW) direction according to the Fleming's left-hand rule.

Therefore, the outer and inner rotating direction pattern portions 20*a* to 20*c* and 20*d* to 20*f* of the first to fifth coil patterns 21 to 25 serve only as a path through which current flows, and a force is generated in the tangential direction from the six radial direction pattern portions 20*g* to 20*f*, to rotate the rotor 120.

Further, the directions of the currents flowing in the coils between the adjacent radial direction pattern portions 20*g* to 20*l* are set opposite to each other, and the magnetic poles of the corresponding magnets of the rotor 120 are also reversely positioned. Thus, the force pushing or pulling the magnets of the rotor in the same direction is generated to thereby rotate the rotor counterclockwise (CCW).

Figure 5A:
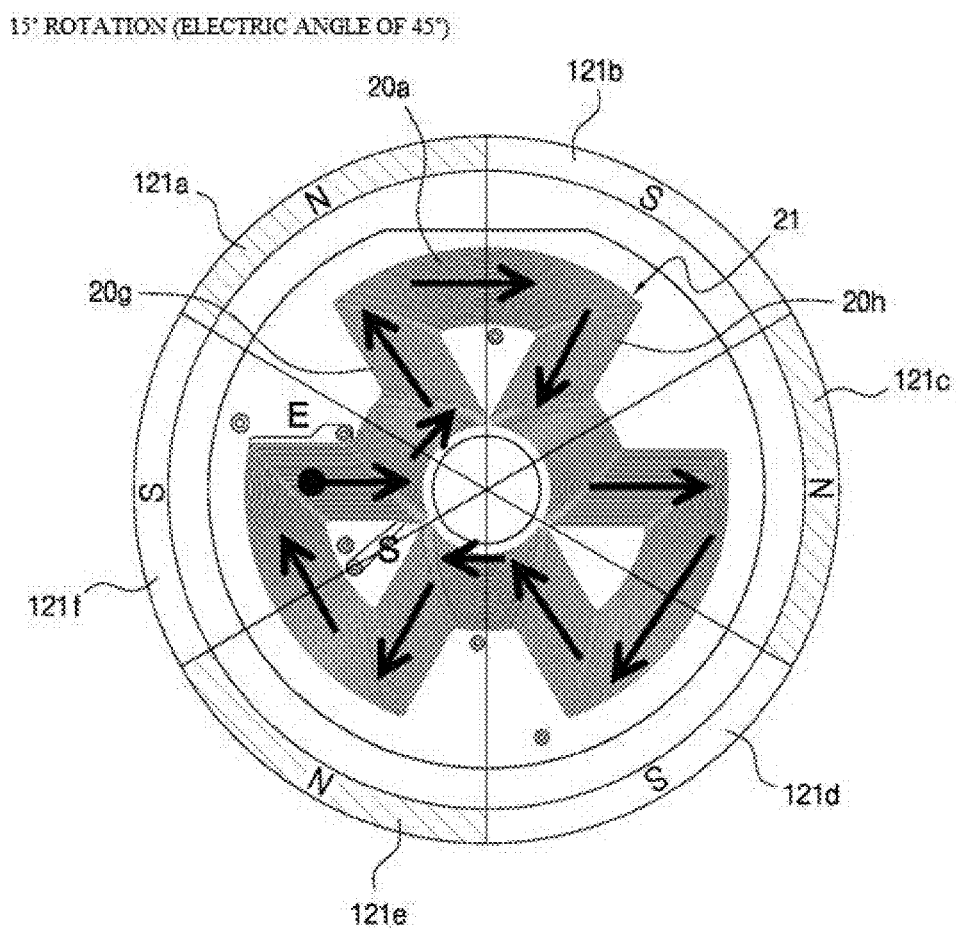
FIGS. 5A to 5D are explanatory diagrams showing directions of currents according to the rotating positions of the rotor, respectively.
Figure 5B:
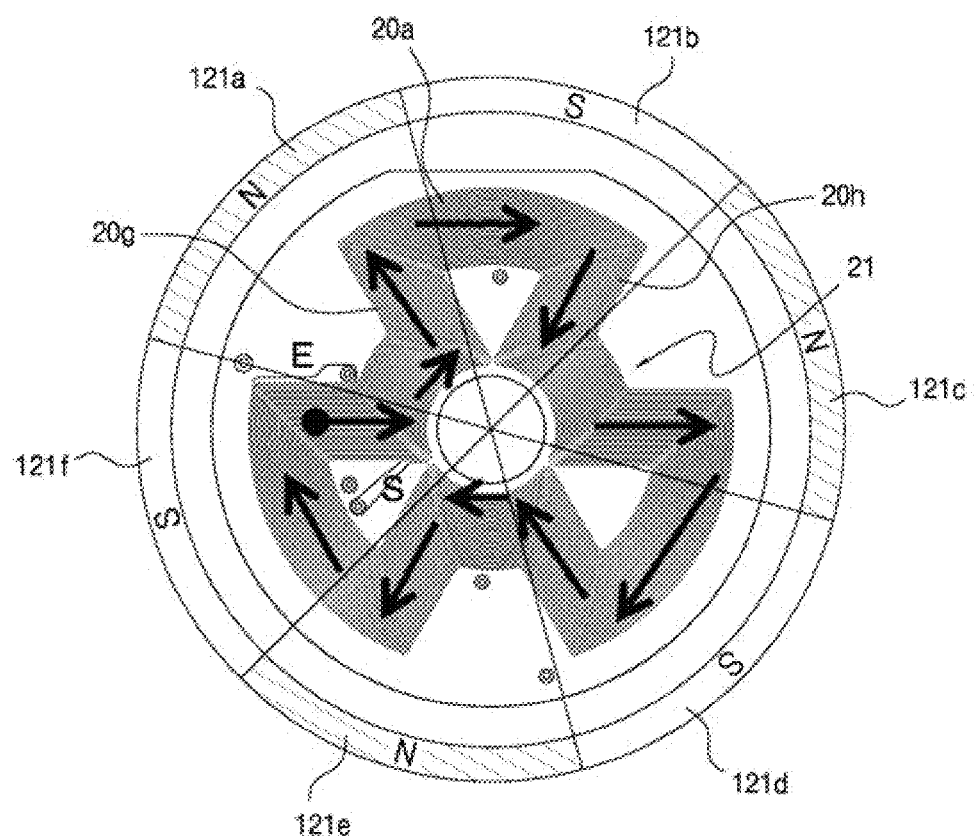
Figure 5C:
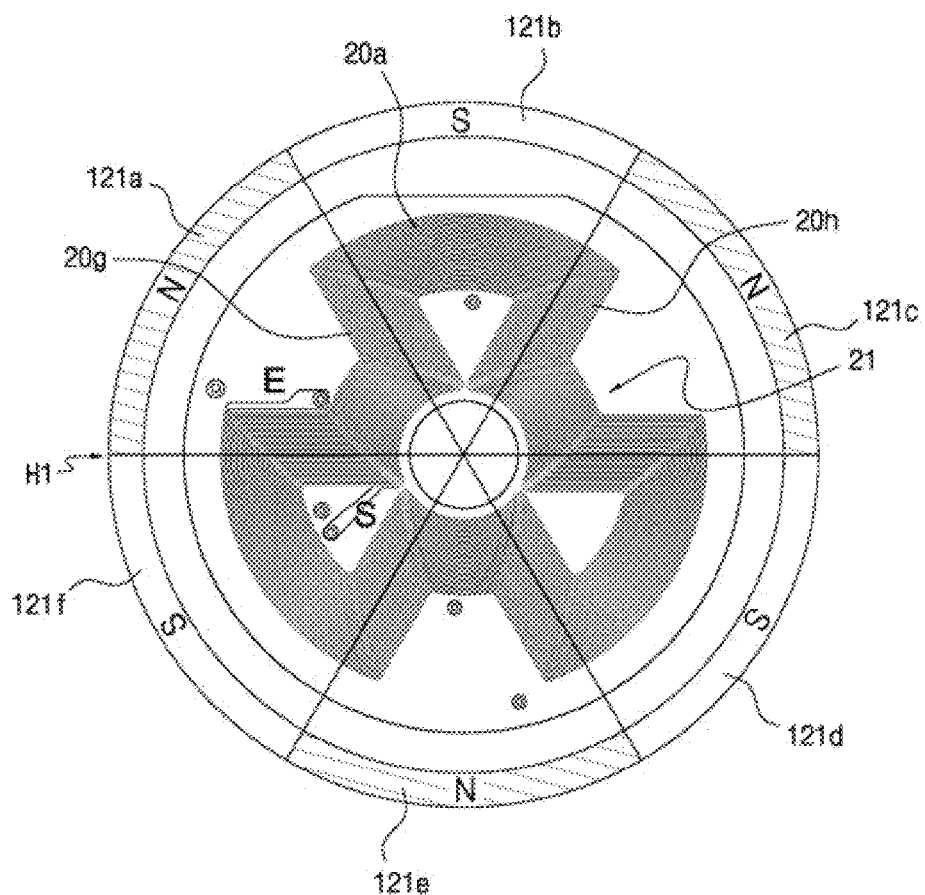
Figure 5D:
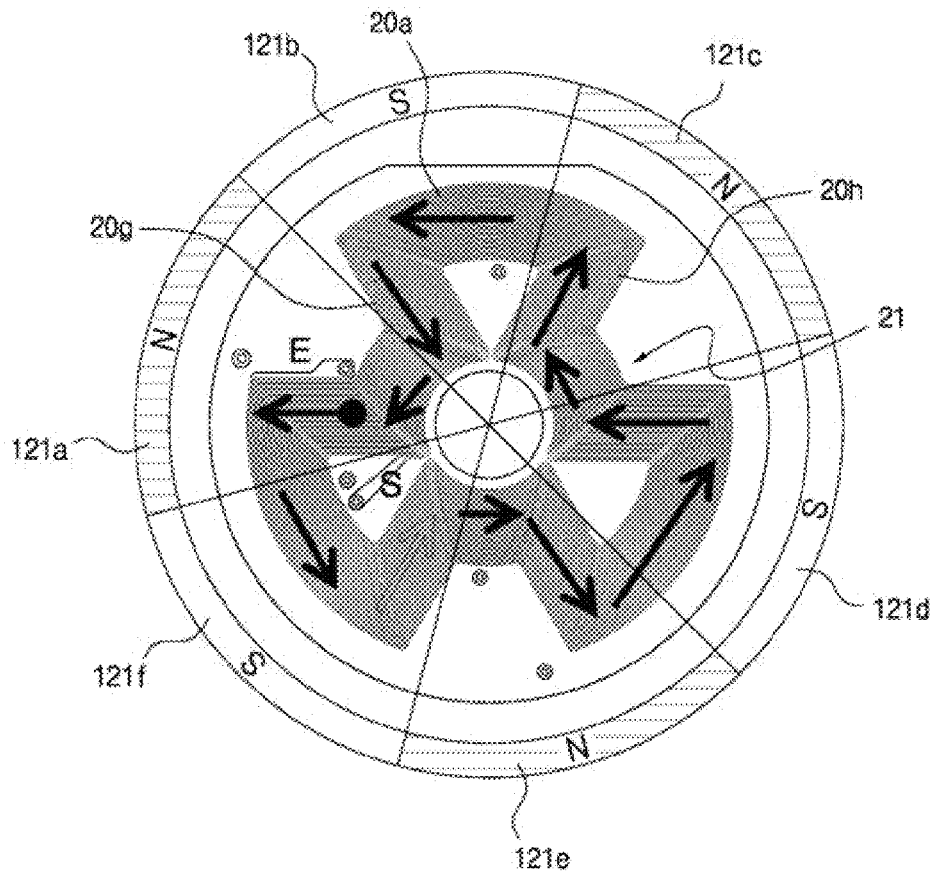

FIG. 5A shows a case where the rotor 120 is rotated by 15° in a mechanical angle (or by 45° in an electrical angle), and FIG. 5B shows a case where the rotor 120 is rotated by 30° in a mechanical angle (or by 90° in an electrical angle), and FIG. 5C shows a case in which the rotor 120 is rotated by 45° in a mechanical angle (or by 135° in an electrical angle).

When the rotor 120 is positioned at the position shown in FIG. 5C, the Hall sensor H1 is located at the interface between the N-pole magnet 121*a* and the S-pole magnet 121*f*, and thus the Hall sensor H1 does not recognize the magnetic pole, and does not determine the flow direction of the current.

FIG. 5D shows a case where the rotor 120 is continuously rotated by the rotational inertia and rotated by 60° in a mechanical angle (or by 180° in an electrical angle). When the rotor rotates over 45° in a mechanical angle (or over 135° in an electrical angle), the Hall sensor H1 recognizes the N-pole magnet 121*a*. In this case, the Hall sensor H1 generates a pair of second rotor position signal outputs having the opposite polarity to the first rotor position signal and applies the generated pair of second rotor position signal outputs to first and second switching transistors, so that the first switching transistor is turned-off and the second switching transistor is turned on and thus the current flow direction of the driving current to the stator coils, that is, the first to fifth coil patterns 21 to 25, is set to be opposite as shown in FIG. 5D.

As a result, as shown in FIG. 5D, when the current flow directions of the driving currents for the first to fifth coil patterns 21 to 25 are reversed, the radial direction pattern portions 20*g* to 20*l* generate a tangential force F in the counterclockwise (CCW) direction in accordance with the Fleming's left-hand rule to thereby rotate the rotor 120.

As described above, the motor driving circuit 30 detects the magnetic pole of the rotor every time the Hall sensor H1 rotates by 60° in a machine angle (or by 180° in an electrical angle), and alternates between the first rotor position signal and the second rotor position signal. Accordingly, the first and second switching transistors are alternately turned on and off to change the direction of current flow of the driving current to the first to fifth coil patterns 21 to 25.

In the single-phase motor 40 according to an embodiment of the present disclosure, the multilayer printed circuit board (PCB) is used to constitute the stacking-type stator 110, and the coil patterns 21 to 25 of each PCB layer are constituted by a plurality of rotating direction pattern portions 20*a* to 20*c* and 20*d* to 20*f* and a plurality of radial direction pattern portions 20*g* to 20*l* which are alternately connected to each other, to have a star shape, and the radial direction pattern portions are oriented in the radial direction, so that the rotational force applied to the opposed rotor 120 can be maximally obtained.

Hereinafter, a stacking-type stator according to a second embodiment of the present disclosure will be described with reference to FIG. 6.

First, the stacking-type stator 110 according to the first embodiment shown in FIG. 2, is configured to have the first and third coil patterns 21 and 23 and the fourth coil pattern 24 have a spiral shape in a clockwise (CW) direction and the second coil pattern 22 and the fifth coil pattern 25 have a helical shape in the counterclockwise (CCW) direction.

That is, in the first embodiment, the coil patterns of the odd-numbered PCB layer are formed to have a helical shape in the clockwise (CW) direction, and the coil patterns of the even-numbered PCB layer are formed to have a helical shape in the counterclockwise (CCW) direction.

Figure 6:
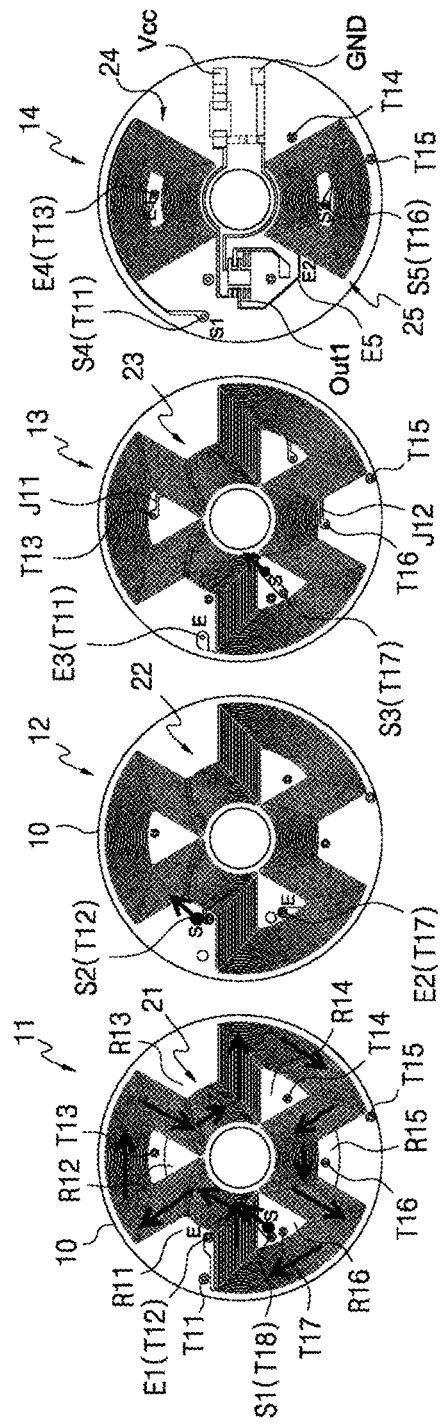
FIG. 6 is a development view showing coil patterns for respective PCB layers of a stacking-type stator according to a second embodiment of the present disclosure.

The stacking-type stator according to the second embodiment shown in FIG. 6, is configured to have all of the first to fourth coil patterns 21 to 24 have a helical shape in the clockwise (CW) direction, and only the fifth coil pattern 25 have a spiral shape in the counterclockwise (CCW) direction.

The first and third coil patterns 21 and 23 are formed such that the start portions S1 and S3 are disposed on the inner side and the end portions E1 and E3 are disposed on the outer side while the second coil pattern 22 is formed such that the start portions S2 is disposed on the outer side and the end portion E2 is disposed on the inner side.

The second embodiment is different from the first embodiment, in that the coil patterns 21 to 23 of all the PCB layers in the second embodiment are formed to have a helical shape in the clockwise (CW) direction.

However, since the fourth and fifth coil patterns 24 and 25 of the fourth PCB layer 14 are disposed at positions opposed to each other in a line symmetrical structure, the fourth coil pattern 24 in both the first and second embodiments is wound in the clockwise (CW) direction, and the fifth coil pattern 25 has a pattern wound in the counterclockwise (CCW) direction.

The stacking-type stator according to the second embodiment is characterized in that when the coil patterns 21 to 23 of all the PCB layers are formed of windings having a helical shape in the clockwise (CW) direction, the first and third coil patterns 21 and 23 of the odd-numbered PCB layers 11 and 13 are provided with start portions S1 and S3 on the inner side and end portions E1 and E3 on the outer side and the second coil pattern 22 of the even-numbered PCB layer 12 is provided with a start portion S2 on the outer side, and an end portion E2 on the inner side.

The stacking-type stator according to the second embodiment is configured such that all the coil patterns 21 to 23 are formed of windings having a helical shape in the clockwise (CW) direction, then the third and fourth jumper wire patterns J11 and J12 are formed on the third PCB layer 13 in order to connect the fourth coil pattern 24 and the fifth coil pattern 25 of the fourth PCB layer 14, and then the fifth jumper wire pattern J13 is formed on the fourth PCB layer 14.

In addition, since the first to third coil patterns 21 to 23 are disposed at the same position and in the same shape in the stacking-type stator according to the second embodiment of the present disclosure, it is possible to secure a wider space for disposing the throughholes used for interconnecting the coil patterns of the respective PCB layers in comparison with the first embodiment.

The remaining portions except the region where the fourth coil pattern 24 and the fifth coil pattern 25 overlap in the first to third coil patterns 21 to 23 are the throughhole regions R11 to R16 where the eleventh to eighteenth throughholes T11 to T18 can be arranged.

That is, when viewed from the first PCB layer 11 as a reference, some of the left and right recessed portions and inner regions of the upper protruding portions of the first to third coil patterns 21 to 23, and some of the inner regions and the recessed portions of the lower protruding portion thereof, correspond to the throughhole regions R11 to R16.

The eleventh to eighteenth throughholes T11 to T18 are disposed in the throughhole regions R11 to R16 and the first to fifth coil patterns 13 to 14 are connected by using the third to fifth jumper wire patterns J11 to J13, to thereby form one stator coil.

That is, the first coil pattern 21 of the first PCB layer 11 is wound in the clockwise direction in the start portion S1, and then the end portion E1 is connected to the start portion S2 of the second coil pattern 22 of the second PCB layer 22 of the third PCB 13 via the twelfth throughhole T12, and the end portion E2 of the second coil pattern 22 is connected to the start portion S3 of the third coil pattern 23 of the third PCB layer 13 via the seventeenth throughhole T17.

In addition, the end portion E3 of the third coil pattern 23 is connected to the start portion S4 of the fourth coil pattern 24 of the fourth PCB layer 14 via the eleventh throughhole T11, and the end portion E4 of the fourth coil pattern 24 and the start portion S5 of the fifth coil pattern 25 are interconnected through the third to fifth jumper wire patterns J11 to J13.

As a result, one end of the stator coil, that is, the end portion E5 of the fifth coil pattern 25 is connected to the first output terminal Out1 of the motor driving circuit 30 and the other end of the stator coil, that is, the start portion S1 of the first coil pattern 21 is connected to the second output terminal Out2 of the motor driving circuit via the seventeenth throughhole T17.

In the stacking-type stator according to the second embodiment of the present disclosure, a part of the motor driving circuit 30 mounted on the fourth PCB layer 14 is disposed on the left side and another part of the motor driving circuit 30 is disposed dispersedly on the right side. When the driving power source Vcc is supplied to the motor driving circuit 30 of the fourth PCB layer 14, the opposite rotor is rotated as in the first embodiment.

Meanwhile, in the single-phase motor using the stacking-type stator according to an embodiment of the present disclosure, one Hall sensor H1 for rotor position detection is disposed on the PCB layer forming the stator, and a dead point prevention yoke made of iron plate or silicon steel can be adopted as a self-starting scheme. When the dead point prevention yoke is used, the initial position of the rotor can be set to stop at a predetermined position. If the Hall sensor is installed at a position where the dead point can be prevented in consideration of the initial position of the rotor, self-starting disabled phenomenon can be prevented.

First, a case where one Hall sensor H1 is disposed on the PCB forming the stator and a separate dead point prevention yoke is disposed on the lower side of the stator to avoid the self-starting disabled phenomenon will be described with reference to FIG. 7A.

Figure 7A:
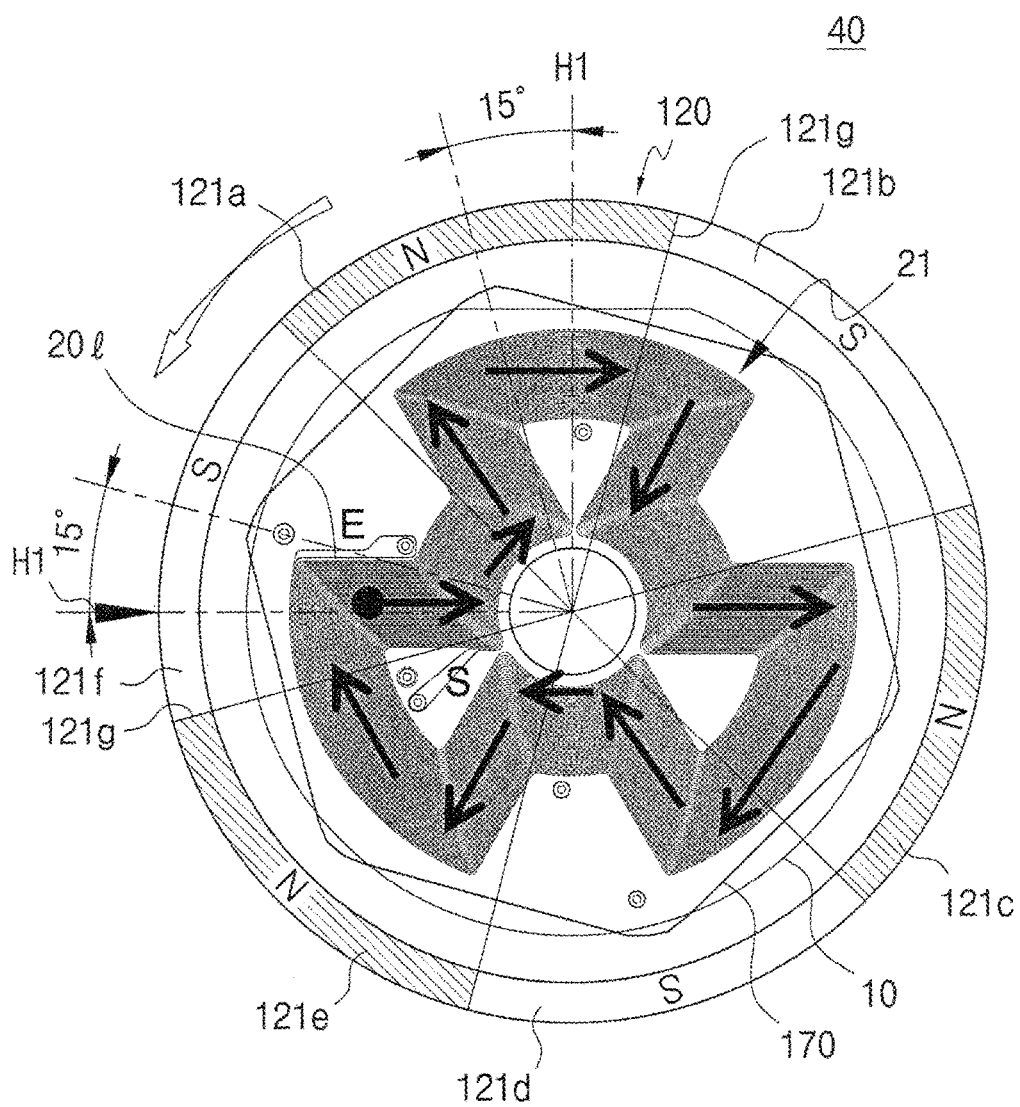
FIG. 7A is an explanatory view for explaining the arrangement relationship between the dead point prevention yoke for self-starting and the Hall sensor when the plate-shaped dead point prevention yoke for self-starting in the single-phase motor according to the present disclosure is used.

As shown in FIG. 7A, the shape of the dead point prevention yoke 170 has a hexagonal outer circumferential surface and a circular inner circumferential surface, similar to the number of the magnetic poles of the rotor 120 (six magnetic poles). In this case, when the rotor 120 is in an initial state, the center of each magnet is positioned opposite to the widest point (i.e., the edge) of the effective area of the dead point prevention yoke 170 by the magnetic phenomenon between the magnet 121 of the rotor 120 and the dead point prevention yoke 170 170), as shown in FIG. 7A.

Therefore, it is preferable that the Hall sensor H1 is disposed at a position shifted from the interface 121g of the magnetic pole by a ¼ magnetic pole width (15° in the case of a six magnetic pole rotor) or by a ¾ magnetic pole width. The reason why the Hall sensor H1 is disposed at a position shifted by ¼ magnetic pole width from the interface 121g of the magnetic pole is that the magnetic flux generated from the magnet 121 at this point is maximum, and thus the rotor position signal of the best sensitivity can be generated.

Further, in some embodiments of the present disclosure, the Hall sensor H1 is arranged at a point shifted by ¼ magnetic pole width from the interface 121g of the magnetic pole in the first to third coil patterns 21 to 23 of the stator, and one of the radial direction pattern portions 20g to 20l is positioned at the same point as the above.

As shown in FIG. 7A, at a state where one radial direction pattern portion 20l of the radial direction pattern portions 20g to 20l is aligned with the Hall sensor H1 and the Hall sensor H1 is disposed at a point shifted by ¼ magnetic pole width from the interface 121g of the magnetic pole, the driving power is applied to the motor driving circuit 30 to start the rotor 120, and then the radial direction pattern portion 20l is opposed to the point where the magnetic flux generated from the magnet 121f is the maximum, so that the self-starting can be performed more easily.

In addition, in the case where the rotating direction of the rotor is counterclockwise (CCW), it is preferable that the Hall sensor H1 is provided at a ¼ magnetic pole width position in the counterclockwise direction from the hexagonal corner of the dead point prevention yoke 170 and in the case where the rotating direction thereof is the clockwise (CW), the Hall sensor H1 is installed at the ¼ magnetic pole width position in the clockwise direction from the hexagonal corner of the dead point prevention yoke 170 to thereby avoid the self-starting disabled phenomenon.

Figure 8:
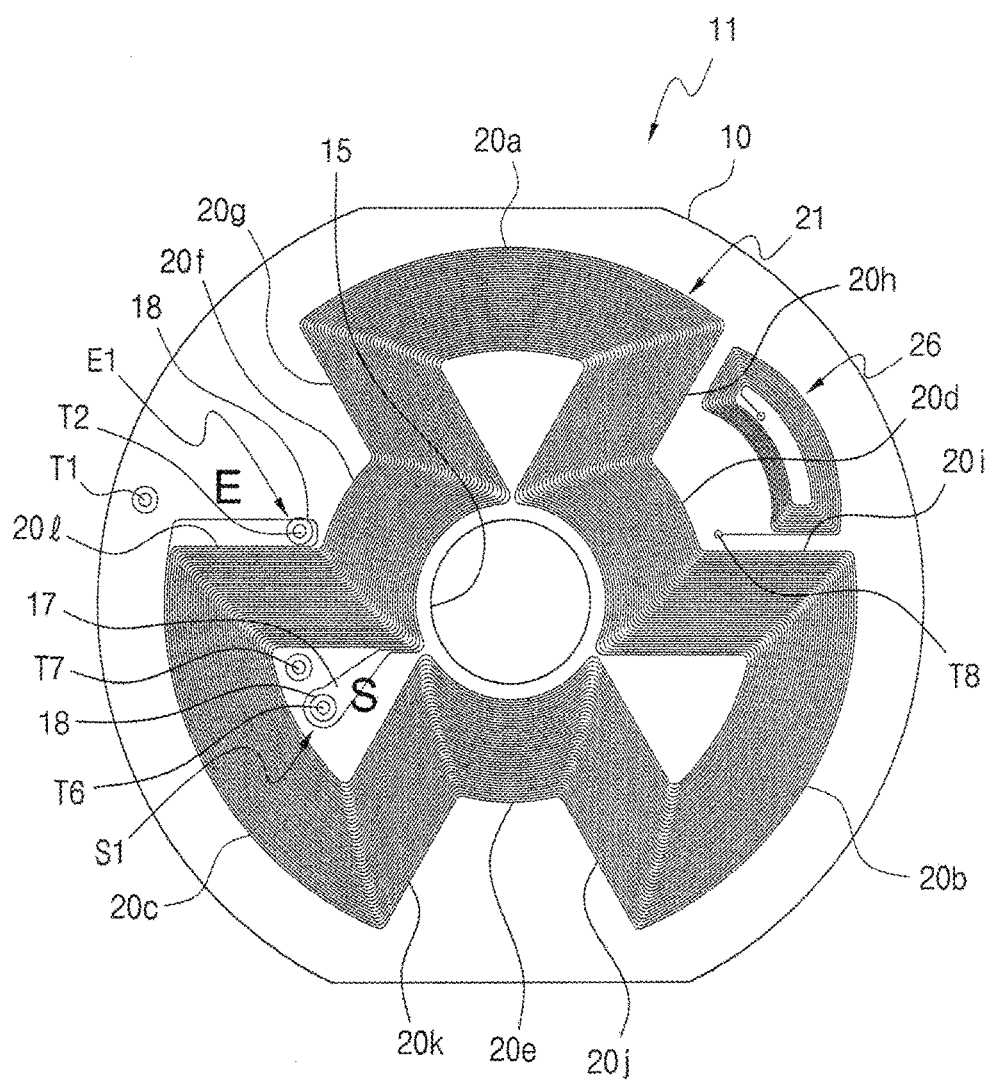
FIG. 8 is a pattern diagram of a first PCB layer of a multilayer PCB in which a sensing coil for rotor position detection is arranged together with a coil pattern to implement a sensorless driving circuit according to the present disclosure.

Meanwhile, FIG. 8 shows a modification where the sensing coil 26 for detecting the position of the rotor is formed in the first PCB layer 11 disposed together with the coil pattern 21 in order to implement a sensorless motor driving circuit according to an embodiment of the present disclosure.

The sensing coil 26 for detecting the rotor position should be selected from three recesses located between the three protrusions forming a space which is not overlapped with the first coil pattern 21 of the first PCB layer 11, that is, a star shape, and a pair of throughholes T8 and T9 for drawing both ends of the sensing coil 26 to the fourth PCB layer 14 should be disposed in a space that does not overlap with the first to fifth coil patterns 21 to 25, and the connection relationship with the motor drive circuit 30 formed on the fourth PCB layer 14 needs to be considered.

The sensing coil 26 for detecting the position of the rotor according to the embodiment of the present disclosure is disposed in the recesses of the first PCB layer 11 in consideration of the above matters and is formed of a conductive pattern having a fan shape as a whole and having a helical shape in the clockwise (CW) direction from the inside to the outside.

As shown in FIG. 8, when the rotor position detecting sensing coil 26 is formed on the first PCB layer 11 facing the rotor, and the magnet 121 approaches the rotor position detecting sensing coil 26, the induction electromotive force corresponding to the rotor magnetic pole is generated by the electromagnetic induction from the sensing coil 26. In this case, the motor driving circuit 30 recognizes the induced electromotive force as a rotor position signal and outputs a switching signal to a switching circuit (not shown) for switching the direction of the driving current to be applied to the stator coil constituted by the first to fifth coil patterns 21 to 25. The switching circuit switches the direction of the driving current flowing in the stator coil when the rotor position signal is applied, so that the rotor continues to rotate in one direction.

In some embodiments of the present disclosure, it is possible to simultaneously form the stator coil by patterning the copper foil of the PCB substrate by a batch process as shown in FIG. 8, and at the same time to form the sensing coil 26 for rotor position detection, which does not cause an increase in manufacturing cost.

Hereinafter, a cooling fan using the above-described stacking-type stator will be described.

Figure 9:
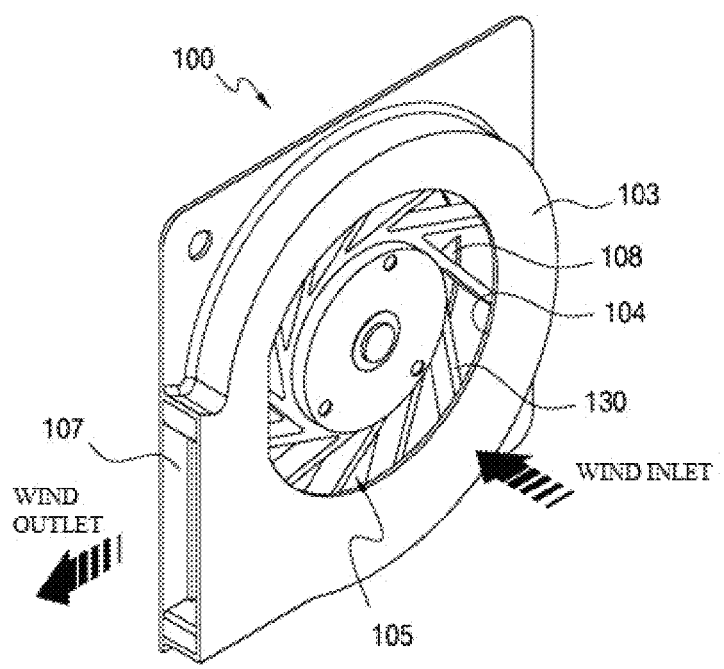
FIG. 9 is a perspective view showing a cooling fan using a slim-type single-phase motor implemented using a stacking-type stator according to the present disclosure.

FIG. 9 shows a cooling fan using a slim-type single-phase motor implemented using a stacking-type stator according to the present disclosure. FIGS. 10 and 11 are axial cross-sectional views showing a slim-type cooling fan according to the first and second embodiments of the present disclosure.

Referring to FIGS. 9 and 10, a cooling fan 100 using a slim-type single-phase motor according to an embodiment of the present disclosure includes a case formed by coupling an upper case 103 and a lower case 101 having a side wall 102 formed therein, and a slim-type single-phase motor 40 implemented using a stacking-type stator 110 provided inside the case.

The single-phase motor 40 includes the stacking-type stator 110, a sleeve bearing 150, a rotating shaft 140, and a rotor 120.

A bearing holder 160 for receiving a sleeve bearing 150 at a central portion of the lower case 101 is integrally formed by, for example, insert molding. The bearing holder 160 includes the sleeve bearing 150 inserted into a cylindrical protruded boss 160a.

In addition, a thrust plate (or a bearing seat) 106 is provided between the sleeve bearing 150 and the inner bottom surface of the bearing holder 160 to support the rotating shaft 140 of the rotor 120.

The stacking-type stator 110 according to the embodiment of the present disclosure as shown in FIG. 2 is mounted on the bottom surface of the lower case 101. The stator 110 has, at a central portion of the stator, a penetration opening 15 formed larger than an outer diameter of the boss 160a of the bearing holder 160.

The rotating shaft 140 of the rotor 120 is coupled to the penetration opening of the sleeve bearing 150 and the rotating shaft 140 is fixed to the center of the rotor 120.

The rotor 120 includes a circular back yoke 123 made of a magnetic material and a plurality of magnets 121 attached to the inner surface of the back yoke 123 so as to serve as a magnetic path, and a single-phase motor 40 is arranged in an axial type structure that the magnets 121 are arranged on the coil of the rotor 110 in a face-to-face fashion.

It is preferable that the plurality of magnets 121 are arranged such that N-poles and S-poles are alternately arranged and the number of magnetic poles is the same as the number of the radial direction pattern portions 20g through 20l of the coil pattern 21. Accordingly, the single-phase motor 40 constructed using the stator of FIG. 1 has a six-slot/six-pole structure.

The back yoke 123 includes, at a center of the back yoke 123, a coupling portion 123e having a penetration opening through which the rotating shaft 140 is fixed, and protrudes outward.

The back yoke 123 has a first cylindrical portion 123b which has a first end receiving groove 123a formed on the inner side and is formed larger than the outer diameter of the boss 160a of the bearing holder 160, and a second cylindrical portion 123d which has a second end receiving groove 123c formed on the outer side and is formed in a size corresponding to the stator 110. A stepped portion is formed in an intermediate portion between the first cylindrical portion 123b and the second cylindrical portion 123d so as to form a receiving groove having a two-stage structure.

The bearing housing 160 is accommodated in the first end accommodating groove 123a of the back yoke 123 and a plurality of magnets 121 are installed in the second end accommodating groove 123c in correspondence with the coil pattern 21 of the stator 110.

The plurality of magnets 121 may be formed of a structure of N-poles and S-poles by split magnetization using a rare-earth magnet or a ferrite magnetic substance having a large coercive force such as Nd alloy or Co alloy, or may be used by fixing disk-shaped Nd magnets to a rotor support with an adhesive.

A plurality of blades 130 are integrally formed on the outer surface of the back yoke 123 of the rotor 120 by insert molding to constitute an impeller 105. In this case, the blades 130 extend to the same level as the first cylindrical portion 123b while surrounding the outer surface of the stepped portion 123b of the back yoke 123 and the second end receiving groove 123c The plurality of blades 130 may extend from the back yoke 123 at an inclination angle or may extend in the radial direction as shown in FIG. 9.

Further, the lower case 101 may include a through slot formed so that a connector or a cable necessary for applying power and control signals from a system body is coupled to the stator 110, and a wind inlet 108 including at least one penetration opening formed so as to suck the heated air inside the main body (for example, a wireless charger or the like) from a direction facing the lower case 101.

As shown in FIG. 9, the lower case 101 includes side walls 102 formed at right angles to the outer circumferential portion thereof and is joined together with the upper case 103 to form a Sirocco type fan, and thus, one side of the fan is opened to form a wind outlet 107 for blowing out the sucked air. In this case, the side walls 102 are formed of the same resin as the bearing holder 160 and is integrally formed with the lower case 101 made of metal by insert molding.

However, the side walls 102 may be formed by insert molding together with the upper case 103 instead of the lower case 101. In addition, the bearing holder 160 and the lower case 101 may be integrally formed by insert molding using resin.

The upper case 103 is also provided with a wind inlet 104 having at least one penetration opening for sucking the heated air inside the main body (for example, a wireless charger or the like) from a direction opposite to the upper case 103, similarly to the lower case 101.

The cooling fan 100 according to the embodiment of the present disclosure is an example in which the wind inlets are formed in both the upper case 103 and the lower case 101, respectively, as shown in FIG. 9, but it is possible to form a wind inlet in one of the upper case 103 and the lower case 101, for example, it is also possible that the wind inlet 104 is formed only in the upper case 103.

In addition, the cooling fan 100 of the embodiment of the present disclosure may be configured to be of an axial flow type which is introduced from one side of the upper case 103 and the lower case 101 and discharged to the other side, depending on the blade shape of the impeller 105, without forming the penetration openings in all the side walls 102, instead of forming the wind outlet 107 at one side of the side wall 102.

The cooling fan 100 of the embodiment of the present disclosure configured as described above employs a single-phase motor 40 as an axial type structure and is configured to include a thin film stacking-type stator as the single-phase motor. As a result, the cooling fan 100 of the embodiment of the present disclosure can be implemented as a slim-type cooling fan 100 because of realizing a single-phase motor 40 having a slimmer structure than a conventional fan motor using a core-type stator.

In addition, the cooling fan 100 of the embodiment of the present disclosure has a structure in which the diameter of a sleeve bearing 150 that supports the rotating shaft 140 of the rotor 120 can be extended to contain sufficient oil by utilizing a space that is obtained by removing a coreless stator used in a conventional radial type motor.

Referring to FIG. 11, the second embodiment of the present disclosure differs from the first embodiment only in the structure of the rotor and the impeller, and the former is the same as the latter, in view of the other parts. Therefore, a description thereof will be omitted.

In the second embodiment, the back yoke 122 of the rotor 120 includes, at the center thereof, a coupling portion 123*f* having a penetration opening through which the rotating shaft 140 is fixed, and which protrudes inward.

The back yoke 122 has a first cylindrical portion 123*b* which has a first end receiving groove 123*a* formed on the inner side and is formed larger than the outer diameter of the boss 160*a* of the bearing holder 160, and a second cylindrical portion 123*d* which has a second end receiving groove 123*c* formed on the outer side and is formed in a size corresponding to the stator 110. A stepped portion is formed in an intermediate portion between the first cylindrical portion 123*b* and the second cylindrical portion 123*d* so as to form a receiving groove having a two-stage structure.

The bearing housing 160 is accommodated in the first end accommodating groove 123*a* of the back yoke 122 and a plurality of magnets 121 are installed in the second end accommodating groove 123*c* in correspondence with the coil pattern 21 of the stator 110.

The back yoke 122 of the rotor 120 has a coupling portion 123*f* having a penetration opening through which the rotating shaft 140 is fixed and which protrudes inward and the length of the sleeve bearing 150 is set to a reduced length by the inwardly protruding length of the coupling portion 123*f* as compared with the first embodiment.

A plurality of blades 130 integrally formed by insert molding on the outer surface of the back yoke 123 so as to constitute the impeller 105 in the first embodiment are extendibly formed in the same level as the second cylindrical portion 123*d*, while surrounding the second end receiving groove 123*c* of the back yoke 123.

In addition, the blades 130 according to the second embodiment are set to have a narrow width as compared with the blades according to the first embodiment and the exposed surface (that is, the uppermost end) of the back yoke 122 and the rotating shaft 140 are set in substantially the same level as the upper case 103. As a result, the heights of the side walls 102 between the upper case 103 and the lower case 101 can be lowered.

As described above, the cooling fan 100 according to the second embodiment of the present disclosure forms the coupling portion 123*f* of the back yoke 122 inwardly and at the same time, the thickness of the entire cooling fan 100 can be more slimly designed by lowering the heights of the sleeve bearing 150, the rotating shaft 140, the blades 130 and the side walls 102.

Figure 12A:
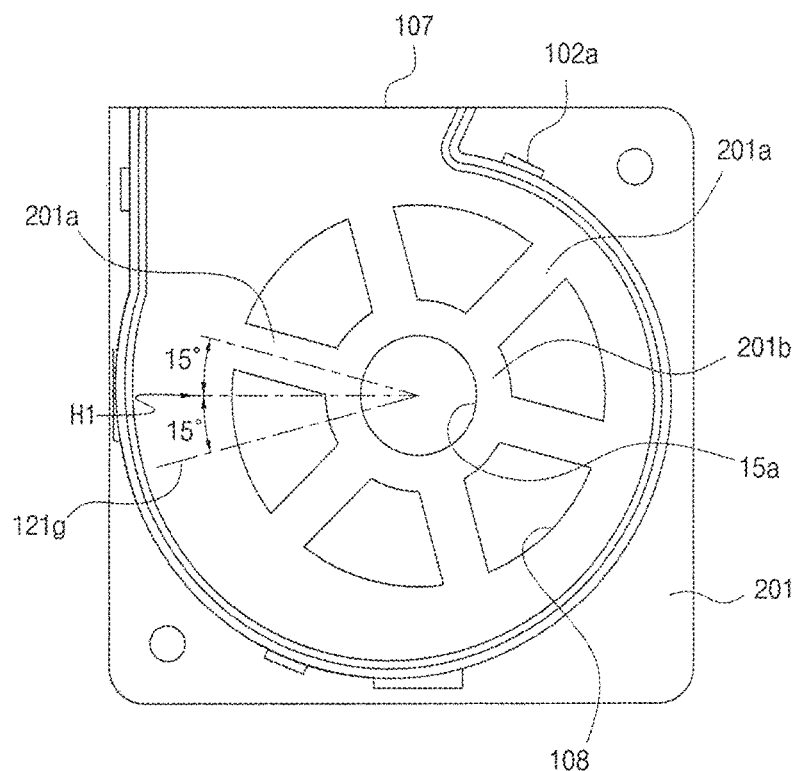
FIG. 12A is a plan view showing a lower case having a dead point prevention yoke function according to a third embodiment of the present disclosure.
Figure 12B:
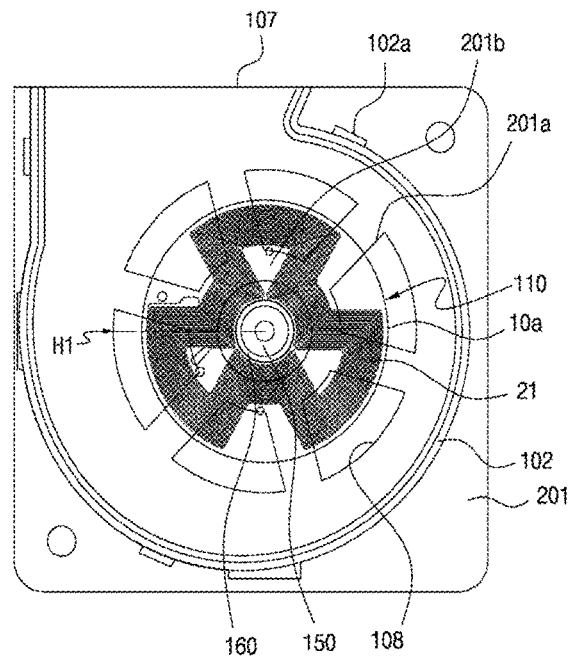
FIG. 12B is a plan view showing a state in which a stacking-type stator is coupled to the lower case.
Figure 12C:
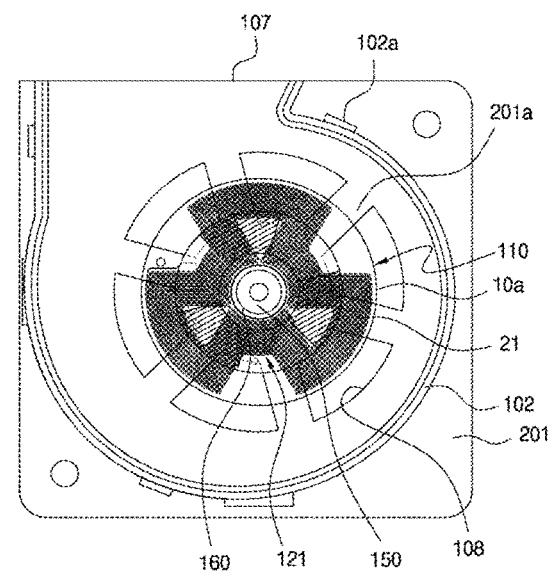
FIG. 12C is a plan view showing a state where the rotor is coupled to the stator in FIG. 12B.
Figure 12D:
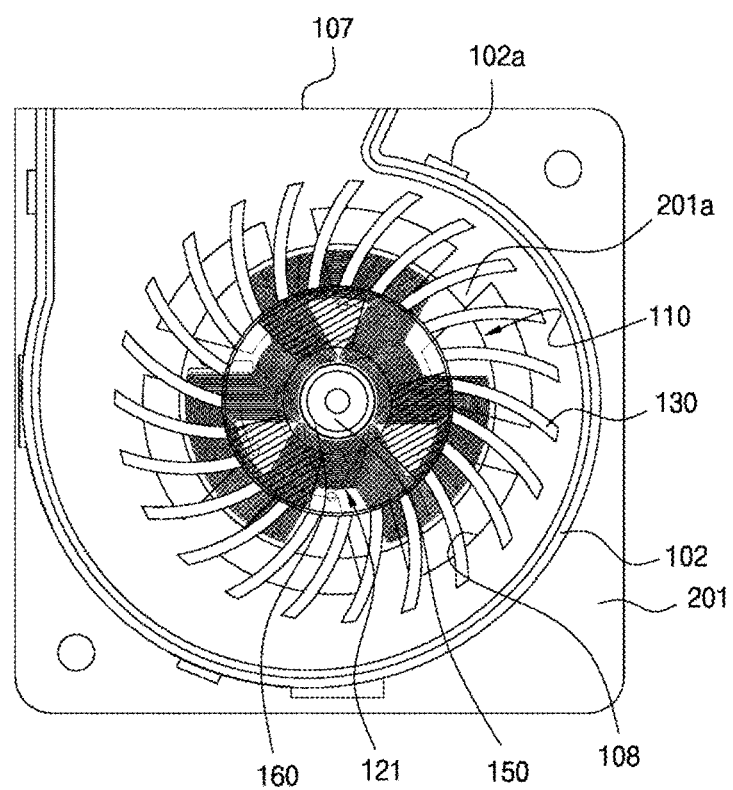
FIG. 12D is a plan view showing a state where the rotor is coupled to the blade in FIG. 12C.

FIG. 12A is a plan view showing a lower case having a dead point prevention yoke function according to a third embodiment of the present disclosure, FIG. 12B is a plan view showing a state in which a stacking-type stator is coupled to the lower case, FIG. 12C is a plan view showing a state where the rotor is coupled to the stator in FIG. 12B, and FIG. 12D is a plan view showing a state where the rotor is coupled to the blade in FIG. 12C.

Referring to FIGS. 12A to 12D, the cooling fan 100 according to the third embodiment of the present disclosure is different from the cooling fan 100 according to the first and second embodiments in that a lower case 201 having a dead point prevention yoke function is employed in the cooling fan 100 according to the third embodiment.

The lower case 201 according to the third embodiment uses a soft magnetic material having a low coercive force such as silicon steel or pure iron to serve as a yoke and is connected to a central annular ring portion 201*b* via bridges of a number corresponding to the number of the magnetic poles of the rotor 120, for example, six bridges 201*a* to have a function of dead point prevention yoke.

The lower case 201 may be formed in a square shape, for example, and one side where the side wall 102 is not formed forms the wind outlet 107 when the upper case 103 is coupled to the lower case 201.

In this case, a penetration opening 15*a* is formed at the center of the annular ring portion 201*b* so that the bearing housing 160 can pass through the penetration opening 15*a*.

Referring to FIGS. 12A to 12D, the bridges 201*a* formed in the lower case 201 are formed in a number corresponding to the number of the magnetic poles of the rotor 120. However, it is also possible to use bridges 201*a* having the number of (the number of magnetic poles divided by two).

When the bridges 201*a* corresponding to the number of magnetic poles of the rotor 120 are formed in the lower case 201 made of a metal material capable of serving as a yoke as described above, the center of each magnet is positioned between the magnet 121 and the bridge 201*a* of the rotor 120 by the magnetic phenomenon while being opposed to the bridge 201*a* in an initial (stopped) state of the rotor 120.

Figure 7B:
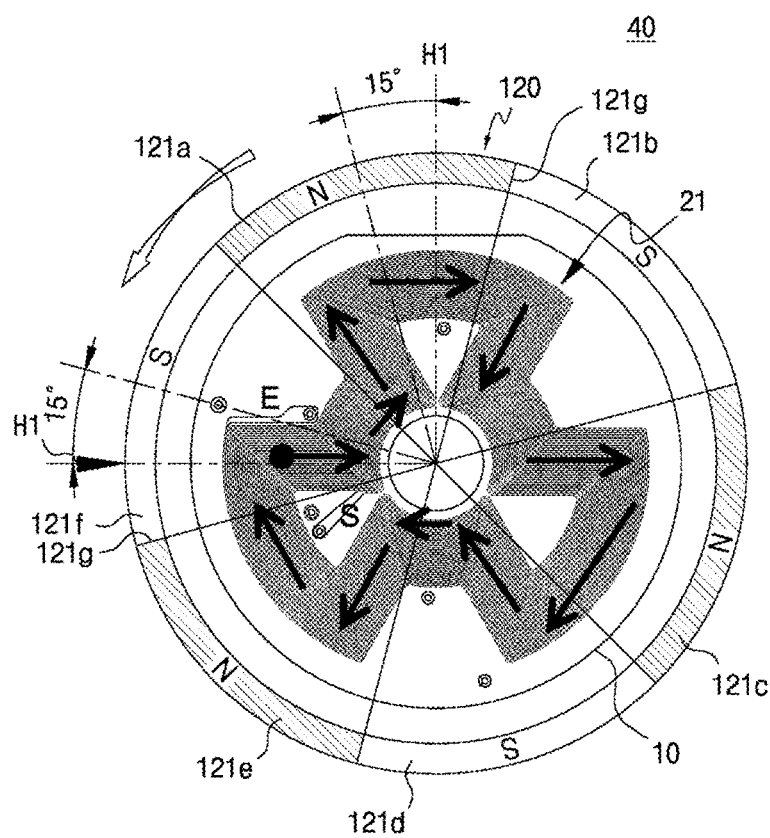
FIG. 7B is an explanatory view for explaining the arrangement relationship between a stator and a Hall sensor when using a lower case having a dead-point prevention yoke function in a single-phase motor according to the present disclosure.

As shown in FIG. 7B, in consideration of the initial state of the rotor 120, the Hall sensor H1 is installed in the stator 110 at a position shifted by the ¼ magnetic pole width (15° in the case of a six pole rotor) or by the ¾ magnetic pole width the width from the magnetic pole interface 121*g*.

The reason why the Hall sensor H1 is disposed at a position shifted by ¼ magnetic pole width from the interface 121*g* of the magnetic pole is that the magnetic flux generated from the magnet 121 at this point is maximum, and thus the rotor position signal of the best sensitivity can be generated.

Considering the continuous rotation due to the moment of inertia of the rotor, the position of the Hall sensor H1 should be located at a position (15° shifted by ¼ magnetic pole width from the interface 121*g* of the magnetic pole. The position shifted by ¼ magnetic pole width from the interface 121*g* of the magnetic pole is the same as the position shifted by ¼ magnetic pole width from the center of the bridge 201*a*.

In addition, it is preferable that the Hall sensor H1 is disposed at a ¼ magnetic pole width (15° in the case of a six pole rotor) from the magnetic pole interface 121*g* and at the same time is set in opposition to one radial direction pattern portion 20*l* of the radial direction pattern portions 20*g* to 20*l* of the coil patterns 21 to 23 in the stacking-type stator 110 to be described later.

As shown in FIG. 7B, at a state where the Hall sensor H1 is aligned with one radial direction pattern portion 20*l* of the radial direction pattern portions 20*g* to 20*l* and is disposed at a point shifted by ¼ magnetic pole width from the interface 121*g* of the magnetic pole, the driving power is applied to the motor driving circuit 30 to start the rotor 120, and then the radial direction pattern portion 20*l* is opposed to the point where the magnetic flux generated from the magnet 121*f* is the maximum, so that the self-starting can be performed more easily.

In addition, when the rotating direction of the rotor 120 is counterclockwise (CCW), it is preferable that the Hall sensor H1 is installed at a ¼ magnetic pole width point counterclockwise from the center point of the bridge 201*a*, and when the rotating direction is clockwise (CW), the Hall sensor H1 is installed at the ¼ magnetic pole width point in the clockwise direction from the intermediate point between the bridges 201*a*, thereby avoiding the self-starting disabled phenomenon.

If the above condition is satisfied, the Hall sensor H1 and the radial direction pattern portion 20*l* are opposed to each other at a point where the magnetic flux generated from each magnet 121 is at maximum when the rotor 120 is started, so that the self-starting can be performed more easily.

As a result, the six bridges 201*a* formed in the lower case 201 have the dead point prevention yoke function, and the space between the bridges 201*a* serves as the wind inlet 108.

In this case, the magnets 121 of the rotor 120 are formed in a ring shape and multipolar magnetized so that N-poles and S-poles are alternately arranged, and the width of the ring is formed greater than at least the length of the radial direction pattern portions 20*g* to 20*l*. Also, the magnets 121 of the rotor 120 are preferably disposed so as to face the radial direction pattern portions 20*g* to 20*l*.

In FIG. 12D, a plurality of blades 130 integrally formed on the rotor 120 constitute an impeller 105. A reference number 102*a* refers to a snap engagement portion that is integrally formed on side walls of the rotor 120, and used when engaged with the upper case 103.

In the above description of the embodiment, the single-phase motor is used as a fan motor, but is also applicable to other fields requiring a compact and slim-type motor in addition to a fan motor.

In addition, the single-phase motor of the above-described embodiments can be operated not only by the single-phase full-wave driving system but also by the single-phase half-wave driving system.

In the above description of the embodiments, a stacking-type stator in which a plurality of printed circuit board (PCB) layers are stacked is used for a single-phase motor. However, in the case of a motor having a small number of turns required for forming a stator coil, it is possible to construct a slim-type stator by using a double-sided PCB. That is, it is also possible to form a coil pattern on one surface of a double-sided printed circuit board (PCB) and form a motor driving circuit on the other surface thereof.

While the present disclosure has been particularly shown and described with reference to exemplary embodiments thereof, by way of illustration and example only, it is clearly understood that the present disclosure is not to be construed as limiting the present disclosure, and various changes and modifications may be made by those skilled in the art within the protective scope of the invention without departing off the spirit of the present disclosure.

INDUSTRIAL APPLICABILITY

The present disclosure can be applied to a stacking-type stator using a multilayer printed circuit board (PCB) in which torque generation can be maximized in an opposite rotor, and a single-phase motor and a cooling fan both using the same.

What is claimed is:

1. A stacking-type stator for a single-phase motor, the stacking-type stator comprising:
   a multilayer printed circuit board (PCB) that is stacked and integrated with a penetration opening; and
   a coil pattern patterned on each layer of the multilayer PCB,
   wherein throughholes are formed to penetrate the multilayer PCB and connect the coil patterns,
   wherein the coil pattern comprises:
   inner and outer rotating direction pattern portions which are arranged in a circumferential direction at intervals along an inner circumference and an outer circumference concentrically with the penetration opening; and
   a radial pattern portion that interconnects the inner rotating direction pattern portion and the outer rotating direction pattern portion that are adjacent to each other and is disposed along the radial direction.

2. The stacking-type stator for a single-phase motor of claim 1, wherein
   the coil pattern is patterned in a spiral pattern so that protrusions and recesses are repeated along the perimeter of the penetration opening to form a plurality of turns, and
   the number of protrusions and recesses are set to any one of the same number, half the number, and two-times the number as the number of rotor magnetic poles.

3. The stacking-type stator for a single-phase motor of claim 1, wherein the coil pattern comprises first to third layer coil patterns formed on first to third layers which are respectively sequentially stacked, in which the first and third layer coil patterns have the same shape and the second layer coil pattern is set to be positioned at a position rotated from the first layer coil pattern to the center of the penetration opening by (360°/rotor magnetic pole number).

4. The stacking-type stator for a single-phase motor of claim 1, further comprising a motor driving circuit mounted on the lowest layer of the multilayer PCB and applying a driving current to a stator coil formed by the layer coil patterns.

5. The stacking-type stator for a single-phase motor of claim 4, wherein the lowest layer further comprises fourth and fifth layer coil patterns arranged in a line-symmetrical structure, and further comprises at least one jumper wire pattern connecting the fourth and fifth layer coil patterns.

6. The stacking-type stator for a single-phase motor of claim 1, further comprising a sensing coil formed on the lowest layer of the multilayer PCB to detect the rotor rotating position.

7. The stacking-type stator for a single-phase motor of claim 6, wherein the sensing coil is disposed in a recess of the coil pattern forming protrusions and recesses.

8. The stacking-type stator for a single-phase motor of claim 1, wherein the number of the radial direction pattern portions is set to any one of the same number, half the number, and two-times the number as the number of rotor magnetic poles.

9. The stacking-type stator for a single-phase motor of claim 8, wherein an angle between the adjacent radial direction pattern portions is set to a value of 360°/n where n may be any one of the same number, half the number, and two-times the number as the number of rotor magnetic poles.

10. A single-phase motor comprising:
a rotating shaft;
a rotor having the rotating shaft supported at a center of the single-phase motor and having a plurality of N-pole magnets and S-pole magnets arranged alternately;
a bearing rotatably supporting the rotation shaft;
a bearing holder for receiving and fixing the bearing; and
the stacking-type stator of claim 1 in which a penetration opening through which the bearing holder passes is formed at a center thereof.

11. The single-phase motor of claim 10, further comprising:
a dead point prevention yoke disposed at a lower portion of the stacking-type stator and having a polygonal corner in which the centers of a plurality of magnets are opposed to each other when the rotor is in an initial state; and
a Hall sensor provided on a layer of the stacking-type stator and arranged at a position shifted by ¼ magnetic pole width or ¾ magnetic pole width from an interface of the rotor magnetic pole in the initial state of the rotor to generate a rotor position signal in which the Hall sensor is disposed at a position overlapping one of the radial direction pattern portions of the stator.

12. The single-phase motor of claim 10, wherein the rotor is formed in a ring shape, and the width of the ring is formed to be larger than at least the length of the radial direction pattern portion, and is arranged to face the radial direction pattern portion.

13. A cooling fan comprising:
a rotor having a rotating shaft supported at a central portion thereof, a plurality of blades for an impeller at an outer circumferential portion thereof, and a plurality of N-pole magnets and S-pole magnets alternately arranged;
a bearing rotatably supporting the rotating shaft;
a bearing holder for receiving and fixing the bearing;
a lower case for supporting the bearing holder;
the stacking-type stator of claim 1 in which a penetration opening through which the bearing holder passes is formed at a center thereof and supported by the lower case;
an upper case disposed opposite to the lower case; and
a side wall connecting the upper case and the lower case.

14. The cooling fan of claim 13, wherein the lower case comprises:
a ring portion formed at a center thereof with the penetration opening through which the bearing holder passes; and
a plurality of bridges connecting the ring portion and the lower case main body,
wherein the plurality of bridges are formed in a number equal to the number of the rotor magnetic or the number of that is the number of magnetic poles/2 to have a dead point prevention yoke function.

15. The cooling fan of claim 13, further comprising a Hall sensor provided on a layer of the stacking-type stator and arranged at a position shifted by ¼ magnetic pole width or ¾ magnetic pole width from an interface of the rotor magnetic pole in the initial state of the rotor to generate a rotor position signal in which the Hall sensor is disposed at a position overlapping one of the radial direction pattern portions of the stator.

16. The cooling fan of claim 13, wherein a back yoke of the rotor comprises:
a coupling portion having a penetration opening through which a rotating shaft is fixed at a central portion thereof and protruding inward;
a first cylindrical portion forming a first end receiving groove in which the bearing holder is accommodated on an inner side thereof;
a second cylindrical portion forming a second end receiving groove in which a plurality of magnets are installed on an outer side thereof and formed in a size corresponding to that of the stator; and
a stepped portion connecting the first cylindrical portion and the second cylindrical portion,
wherein the plurality of blades constituting the impeller surround the second end receiving groove of the back yoke and are extendibly formed in the same level as the second cylindrical portion.

17. The cooling fan of claim 13, wherein a back yoke of the rotor comprises:
a coupling portion having a penetration opening through which a rotating shaft is fixed at a central portion thereof;
a first cylindrical portion forming a first end receiving groove in which the bearing holder is accommodated on an inner side thereof;
a second cylindrical portion forming a second end receiving groove in which a plurality of magnets are installed on an outer side thereof and formed in a size corresponding to that of the stator; and
a stepped portion connecting the first cylindrical portion and the second cylindrical portion,
wherein the plurality of blades constituting the impeller are extendibly formed while surrounding the first and second end receiving grooves of the back yoke.

* * * * *